(12) United States Patent
Nazzaro

(10) Patent No.: US 12,440,617 B2
(45) Date of Patent: Oct. 14, 2025

(54) LINEAR ACTIVATED DRUG DOSING PUMP SYSTEM

(71) Applicant: Insulet Corporation, Acton, MA (US)

(72) Inventor: David Nazzaro, Groveland, MA (US)

(73) Assignee: INSULET CORPORATION, Acton, MA (US)

( * ) Notice: Subject to any disclaimer, the term of this patent is extended or adjusted under 35 U.S.C. 154(b) by 818 days.

(21) Appl. No.: 17/569,018

(22) Filed: Jan. 5, 2022

(65) Prior Publication Data

US 2022/0218893 A1 Jul. 14, 2022

Related U.S. Application Data

(60) Provisional application No. 63/135,857, filed on Jan. 11, 2021.

(51) Int. Cl.
*A61M 5/142* (2006.01)
*A61M 5/168* (2006.01)

(52) U.S. Cl.
CPC ...... *A61M 5/1422* (2013.01); *A61M 5/14236* (2013.01); *A61M 5/16813* (2013.01)

(58) Field of Classification Search
CPC .... A61M 5/1409; A61M 5/142; A61M 5/165; A61M 5/16881; A61M 39/24; A61M 5/16827; A61M 5/284; A61M 5/31511; A61M 5/31578; A61M 5/31596; A61M 39/225; A61M 2005/1787; A61M 2039/0018; A61M 2039/242; A61M 5/1422; A61M 5/14236; A61M 5/16813
USPC .......................................................... 604/46
See application file for complete search history.

(56) References Cited

U.S. PATENT DOCUMENTS

| 1,441,508 | A | 1/1923 | Jensen |
| 2,198,666 | A | 4/1940 | Gruskin |
| 2,752,918 | A | 7/1956 | Uytenbogaar |
| 3,176,712 | A | 4/1965 | Ramsden |
| 3,297,260 | A | 1/1967 | Barlow |

(Continued)

FOREIGN PATENT DOCUMENTS

| CA | 606281 A | 10/1960 |
| CN | 1375338 A | 10/2002 |

(Continued)

OTHER PUBLICATIONS

International Search Report and Written Opinion for PCT/US2018/014351, mailed on Jun. 4, 2018, 9 pages.

(Continued)

*Primary Examiner* — Scott J Medway
*Assistant Examiner* — Anh Bui
(74) *Attorney, Agent, or Firm* — Goodwin Procter LLP

(57) ABSTRACT

A novel embodiment of a pump system, for example, of the type that would be used in a wearable drug delivery system, comprises dual linear-actuated plungers disposed in a pump chamber. The plungers are coupled to a leadscrew having both left-hand and right-hand threads such that rotation of leadscrew in a first direction moves the plungers together and rotation of leadscrew in a second, opposite direction moves the plungers apart. Movement of the plungers away from each other draws one or more doses of a liquid drug from a reservoir into the pump chamber, while movement of the plungers together forces liquid drug to a patient interface for delivery to the patient.

15 Claims, 13 Drawing Sheets

(56) References Cited

U.S. PATENT DOCUMENTS

| | | |
|---|---|---|
| 3,464,359 A | 9/1969 | King |
| 3,885,662 A | 5/1975 | Schaefer |
| 3,946,732 A | 3/1976 | Hurscham |
| 3,947,692 A | 3/1976 | Payne |
| 3,993,061 A | 11/1976 | OLeary |
| 4,108,177 A | 8/1978 | Pistor |
| 4,152,098 A | 5/1979 | Moody et al. |
| 4,210,173 A | 7/1980 | Choksi et al. |
| 4,221,219 A | 9/1980 | Tucker |
| 4,257,324 A | 3/1981 | Stefansson et al. |
| 4,268,150 A | 5/1981 | Chen |
| 4,277,226 A | 7/1981 | Archibald |
| 4,313,439 A | 2/1982 | Babb et al. |
| 4,371,790 A | 2/1983 | Manning et al. |
| 4,417,889 A | 11/1983 | Choi |
| 4,424,720 A | 1/1984 | Bucchianeri |
| 4,435,173 A | 3/1984 | Siposs et al. |
| 4,475,905 A | 10/1984 | Himmelstrup |
| 4,498,843 A | 2/1985 | Schneider et al. |
| 4,507,115 A | 3/1985 | Kambara et al. |
| 4,551,134 A | 11/1985 | Slavik et al. |
| 4,562,751 A | 1/1986 | Nason et al. |
| 4,567,549 A | 1/1986 | Lemme |
| 4,585,439 A | 4/1986 | Michel |
| 4,601,707 A | 7/1986 | Albisser et al. |
| 4,634,427 A | 1/1987 | Hannula et al. |
| 4,671,429 A | 6/1987 | Spaanderman et al. |
| 4,678,408 A | 7/1987 | Nason et al. |
| 4,684,368 A | 8/1987 | Kenyon |
| 4,685,903 A | 8/1987 | Cable et al. |
| 4,755,169 A | 7/1988 | Sarnoff et al. |
| 4,766,889 A | 8/1988 | Trick et al. |
| 4,808,161 A | 2/1989 | Kamen |
| 4,846,797 A | 7/1989 | Howson et al. |
| 4,858,619 A | 8/1989 | Toth |
| 4,898,579 A | 2/1990 | Groshong et al. |
| 4,908,017 A | 3/1990 | Howson et al. |
| 4,944,659 A | 7/1990 | Labbe et al. |
| 4,969,874 A | 11/1990 | Michel et al. |
| 4,991,743 A | 2/1991 | Walker |
| 5,007,458 A | 4/1991 | Marcus et al. |
| 5,020,325 A | 6/1991 | Henault |
| 5,062,841 A | 11/1991 | Siegel |
| 5,147,311 A | 9/1992 | Pickhard |
| 5,178,609 A | 1/1993 | Ishikawa |
| 5,205,819 A | 4/1993 | Ross et al. |
| 5,213,483 A | 5/1993 | Flaherty et al. |
| 5,222,362 A | 6/1993 | Maus et al. |
| 5,236,416 A | 8/1993 | McDaniel et al. |
| 5,261,882 A | 11/1993 | Sealfon |
| 5,261,884 A | 11/1993 | Stern et al. |
| 5,277,338 A | 1/1994 | Divall et al. |
| 5,281,202 A | 1/1994 | Weber et al. |
| 5,346,476 A | 9/1994 | Elson |
| 5,364,342 A | 11/1994 | Beuchat et al. |
| 5,388,615 A | 2/1995 | Edlund et al. |
| 5,433,710 A | 7/1995 | VanAntwerp et al. |
| 5,503,628 A | 4/1996 | Fetters et al. |
| 5,520,661 A | 5/1996 | Lal et al. |
| 5,533,389 A | 7/1996 | Kamen et al. |
| 5,582,593 A | 12/1996 | Hultman |
| 5,618,269 A | 4/1997 | Jacobsen et al. |
| 5,628,309 A | 5/1997 | Brown |
| 5,637,095 A | 6/1997 | Nason et al. |
| 5,665,070 A | 9/1997 | McPhee |
| 5,713,875 A | 2/1998 | Tanner, II |
| 5,747,350 A | 5/1998 | Sattler |
| 5,748,827 A | 5/1998 | Holl et al. |
| 5,776,103 A | 7/1998 | Kriesel et al. |
| 5,779,676 A | 7/1998 | Kriesel et al. |
| 5,785,688 A | 7/1998 | Joshi et al. |
| 5,797,881 A | 8/1998 | Gadot |
| 5,800,397 A | 9/1998 | Wilson et al. |
| 5,807,075 A | 9/1998 | Jacobsen et al. |
| 5,839,467 A | 11/1998 | Saaski et al. |
| 5,891,097 A | 4/1999 | Saito et al. |
| 5,897,530 A | 4/1999 | Jackson |
| 5,906,597 A | 5/1999 | McPhee |
| 5,911,716 A | 6/1999 | Rake et al. |
| 5,919,167 A | 7/1999 | Mulhauser et al. |
| 5,957,890 A | 9/1999 | Mann et al. |
| 5,961,492 A | 10/1999 | Kriesel et al. |
| 5,971,963 A | 10/1999 | Choi |
| 6,019,747 A | 2/2000 | McPhee |
| 6,050,457 A | 4/2000 | Arnold et al. |
| 6,068,615 A | 5/2000 | Brown et al. |
| 6,159,188 A | 12/2000 | Laibovitz et al. |
| 6,174,300 B1 | 1/2001 | Kriesel et al. |
| 6,190,359 B1 | 2/2001 | Heruth |
| 6,200,293 B1 | 3/2001 | Kriesel et al. |
| 6,352,522 B1 | 3/2002 | Kim et al. |
| 6,363,609 B1 | 4/2002 | Pickren |
| 6,375,638 B2 | 4/2002 | Nason et al. |
| 6,474,219 B2 | 11/2002 | Klitmose et al. |
| 6,485,461 B1 | 11/2002 | Mason et al. |
| 6,485,462 B1 | 11/2002 | Kriesel |
| 6,488,652 B1 | 12/2002 | Weijand et al. |
| 6,520,936 B1 | 2/2003 | Mann |
| 6,527,744 B1 | 3/2003 | Kriesel et al. |
| 6,537,249 B2 | 3/2003 | Kriesell et al. |
| 6,539,286 B1 | 3/2003 | Jiang |
| 6,569,115 B1 | 5/2003 | Barker et al. |
| 6,595,956 B1 | 7/2003 | Gross et al. |
| 6,656,158 B2 | 12/2003 | Mahoney et al. |
| 6,699,218 B2 | 3/2004 | Flaherty et al. |
| 6,723,072 B2 | 4/2004 | Flaherty et al. |
| 6,740,059 B2 | 5/2004 | Flaherty |
| 6,749,407 B2 | 6/2004 | Xie et al. |
| 6,851,260 B2 | 2/2005 | Mernoe |
| 6,883,778 B1 | 4/2005 | Newton et al. |
| 7,018,360 B2 | 3/2006 | Flaherty et al. |
| 7,104,275 B2 | 9/2006 | Dille |
| 7,128,727 B2 | 10/2006 | Flaherty et al. |
| 7,137,964 B2 | 11/2006 | Flaherty |
| 7,160,272 B1 | 1/2007 | Eyal et al. |
| 7,303,549 B2 | 12/2007 | Flaherty |
| 7,771,392 B2 | 8/2010 | De Polo et al. |
| 7,914,499 B2 | 3/2011 | Gonnelli et al. |
| 7,951,114 B2 | 5/2011 | Rush et al. |
| 8,267,921 B2 | 9/2012 | Yodfat et al. |
| 8,382,703 B1 | 2/2013 | Abdelaal |
| 8,499,913 B2 | 8/2013 | Gunter |
| 8,905,995 B2 | 12/2014 | Mernoe |
| 8,920,376 B2 | 12/2014 | Caffey et al. |
| 8,939,935 B2 | 1/2015 | OConnor et al. |
| 9,180,244 B2 | 11/2015 | Anderson et al. |
| 9,192,716 B2 | 11/2015 | Jugl et al. |
| 9,402,950 B2 | 8/2016 | Dilanni et al. |
| 9,539,596 B2 | 1/2017 | Ikushima |
| 10,441,723 B2 | 10/2019 | Nazzaro |
| 10,695,485 B2 | 6/2020 | Nazzaro |
| 2001/0016710 A1 | 8/2001 | Nason et al. |
| 2001/0056258 A1 | 12/2001 | Evans |
| 2002/0029018 A1 | 3/2002 | Jeffrey |
| 2002/0032374 A1 | 3/2002 | Holker et al. |
| 2002/0037221 A1 | 3/2002 | Mastrangelo et al. |
| 2002/0173769 A1 | 11/2002 | Gray et al. |
| 2002/0173830 A1 | 11/2002 | Starkweather et al. |
| 2003/0040715 A1 | 2/2003 | DAntonio et al. |
| 2003/0055380 A1* | 3/2003 | Flaherty ............ A61M 5/14526 604/155 |
| 2003/0097092 A1 | 5/2003 | Flaherty |
| 2003/0109827 A1 | 6/2003 | Lavi et al. |
| 2003/0163097 A1 | 8/2003 | Fleury et al. |
| 2003/0198558 A1 | 10/2003 | Nason et al. |
| 2003/0199825 A1 | 10/2003 | Flaherty |
| 2004/0010207 A1 | 1/2004 | Flaherty et al. |
| 2004/0064088 A1 | 4/2004 | Gorman et al. |
| 2004/0068224 A1 | 4/2004 | Couvillon, Jr. et al. |
| 2004/0069044 A1 | 4/2004 | Lavi et al. |
| 2004/0092865 A1 | 5/2004 | Flaherty et al. |
| 2004/0094733 A1 | 5/2004 | Hower et al. |
| 2004/0153032 A1 | 8/2004 | Garribotto et al. |
| 2005/0020980 A1 | 1/2005 | Inoue et al. |

(56) References Cited

U.S. PATENT DOCUMENTS

| | | |
|---|---|---|
| 2005/0165363 A1 | 7/2005 | Judson et al. |
| 2005/0203461 A1 | 9/2005 | Flaherty et al. |
| 2005/0238507 A1 | 10/2005 | Dilanni et al. |
| 2005/0273059 A1 | 12/2005 | Mernoe |
| 2005/0277882 A1 | 12/2005 | Kriesel |
| 2006/0041229 A1 | 2/2006 | Garibotto et al. |
| 2006/0079765 A1 | 4/2006 | Neer et al. |
| 2006/0155210 A1 | 7/2006 | Beckman et al. |
| 2006/0173439 A1 | 8/2006 | Thorne et al. |
| 2006/0178633 A1 | 8/2006 | Garibotto et al. |
| 2006/0253085 A1 | 11/2006 | Geismar et al. |
| 2006/0282290 A1 | 12/2006 | Flaherty et al. |
| 2007/0005018 A1 | 1/2007 | Tekbuchava |
| 2007/0073236 A1 | 3/2007 | Merno et al. |
| 2007/0088271 A1 | 4/2007 | Richards |
| 2007/0118405 A1 | 5/2007 | Campbell et al. |
| 2007/0282269 A1 | 12/2007 | Carter et al. |
| 2008/0004515 A1 | 1/2008 | Jennewine |
| 2008/0051738 A1 | 2/2008 | Griffin |
| 2008/0114304 A1 | 5/2008 | Nalesso et al. |
| 2008/0172028 A1 | 7/2008 | Blomquist |
| 2008/0243211 A1 | 10/2008 | Cartwright et al. |
| 2008/0294040 A1 | 11/2008 | Mohiuddin et al. |
| 2009/0024083 A1 | 1/2009 | Kriesel et al. |
| 2009/0062767 A1 | 3/2009 | Van Antwerp et al. |
| 2009/0198215 A1 | 8/2009 | Chong et al. |
| 2009/0278875 A1 | 11/2009 | Holm et al. |
| 2009/0326472 A1 | 12/2009 | Carter et al. |
| 2010/0036326 A1 | 2/2010 | Matusch |
| 2010/0152658 A1 | 6/2010 | Hanson et al. |
| 2010/0241066 A1 | 9/2010 | Hansen et al. |
| 2011/0054399 A1 | 3/2011 | Chong et al. |
| 2011/0073620 A1 | 3/2011 | Verrilli |
| 2011/0144586 A1 | 6/2011 | Michaud et al. |
| 2011/0180480 A1 | 7/2011 | Kloeffel et al. |
| 2011/0230833 A1 | 9/2011 | Landman et al. |
| 2011/0251579 A1* | 10/2011 | Aklog ............... A61M 5/16804 604/131 |
| 2012/0078161 A1 | 3/2012 | Masterson et al. |
| 2012/0172817 A1 | 7/2012 | Bruggemann et al. |
| 2012/0209207 A1 | 8/2012 | Gray et al. |
| 2012/0232658 A1* | 9/2012 | Morgenstern Lopez ................ A61F 2/447 606/90 |
| 2013/0006213 A1 | 1/2013 | Arnitz et al. |
| 2013/0017099 A1 | 1/2013 | Genoud |
| 2013/0064701 A1 | 3/2013 | Konishi |
| 2013/0177455 A1 | 7/2013 | Kamen et al. |
| 2013/0178803 A1 | 7/2013 | Raab |
| 2013/0245545 A1 | 9/2013 | Arnold et al. |
| 2013/0267932 A1 | 10/2013 | Franke et al. |
| 2013/0296792 A1 | 11/2013 | Cabiri |
| 2014/0018730 A1 | 1/2014 | Muller-Pathle |
| 2014/0127048 A1 | 5/2014 | Dilanni et al. |
| 2014/0128839 A1 | 5/2014 | Dilanni et al. |
| 2014/0142508 A1 | 5/2014 | Dilanni et al. |
| 2014/0148784 A1 | 5/2014 | Anderson et al. |
| 2014/0171901 A1 | 6/2014 | Langsdorf et al. |
| 2015/0041498 A1 | 2/2015 | Kakiuchi et al. |
| 2015/0051487 A1* | 2/2015 | Uber, III ............. A61M 5/1422 600/432 |
| 2015/0057613 A1 | 2/2015 | Clemente et al. |
| 2015/0064036 A1 | 3/2015 | Eberhard |
| 2015/0137017 A1 | 5/2015 | Ambrosina et al. |
| 2015/0202386 A1 | 7/2015 | Brady et al. |
| 2015/0290389 A1 | 10/2015 | Nessel |
| 2015/0297825 A1 | 10/2015 | Focht et al. |
| 2016/0008549 A1 | 1/2016 | Plumptre et al. |
| 2016/0025544 A1 | 1/2016 | Kamer |
| 2016/0055842 A1 | 2/2016 | Defranks et al. |
| 2016/0082242 A1 | 3/2016 | Burton et al. |
| 2016/0129190 A1 | 5/2016 | Haitsuka |
| 2016/0193423 A1 | 7/2016 | Bilton |
| 2016/0213851 A1 | 7/2016 | Weibel et al. |
| 2017/0021096 A1 | 1/2017 | Cole et al. |
| 2017/0021137 A1 | 1/2017 | Cole |
| 2017/0100541 A1 | 4/2017 | Constantineau et al. |
| 2017/0216516 A1 | 8/2017 | Dale |
| 2017/0239415 A1 | 8/2017 | Hwang et al. |
| 2017/0290975 A1 | 10/2017 | Barmaimon et al. |
| 2018/0021521 A1 | 1/2018 | Sanchez |
| 2018/0185579 A1 | 7/2018 | Joseph et al. |
| 2018/0313346 A1 | 11/2018 | Oakes |
| 2019/0192782 A1 | 6/2019 | Pedersen et al. |
| 2019/0365993 A1 | 12/2019 | Staub et al. |
| 2020/0009315 A1 | 1/2020 | Brouet et al. |
| 2020/0345931 A1 | 11/2020 | Gray et al. |

FOREIGN PATENT DOCUMENTS

| | | |
|---|---|---|
| CN | 102498292 B | 7/2015 |
| CN | 204972511 U | 1/2016 |
| CN | 105764543 B | 7/2016 |
| CN | 206175149 U | 5/2017 |
| CN | 107096091 A | 8/2017 |
| CN | 108472441 A | 8/2018 |
| DE | 4200595 A1 | 7/1993 |
| DE | 19723648 C1 | 8/1998 |
| DE | 102005040344 A1 | 3/2007 |
| EP | 0454331 A1 | 10/1991 |
| EP | 0789146 A1 | 8/1997 |
| EP | 867196 A2 | 9/1998 |
| EP | 1065378 A2 | 1/2001 |
| EP | 1177802 A1 | 2/2002 |
| EP | 1403519 A1 | 3/2004 |
| EP | 2397181 A1 | 12/2011 |
| EP | 2468338 A1 | 6/2012 |
| EP | 2703024 A1 | 3/2014 |
| EP | 1874390 B1 | 10/2014 |
| EP | 2830499 A1 | 2/2015 |
| FR | 2096275 A5 | 2/1972 |
| FR | 2455269 A1 | 11/1980 |
| FR | 2507637 A1 | 12/1982 |
| FR | 2731475 A1 | 9/1996 |
| GB | 357139 A | 9/1931 |
| GB | 810488 A | 3/1959 |
| GB | 875034 A | 8/1961 |
| GB | 1204836 A | 9/1970 |
| GB | 2008806 A | 6/1979 |
| GB | 2077367 A | 12/1981 |
| GB | 2456681 A | 7/2009 |
| GB | 2549750 A | 11/2017 |
| IL | 46017 A | 11/1977 |
| JP | 06063133 A | 3/1994 |
| JP | H06296690 A | 10/1994 |
| JP | H08238324 A | 9/1996 |
| JP | 2004247271 A | 9/2004 |
| JP | 2004274719 A | 9/2004 |
| JP | 2005188355 A | 7/2005 |
| JP | 2006159228 A | 6/2006 |
| JP | 6098988 B2 | 9/2006 |
| JP | 2006249130 A | 9/2006 |
| JP | 2009514580 A | 4/2009 |
| JP | 2017513577 A | 6/2017 |
| NL | 1019126 C1 | 4/2003 |
| WO | 8101658 A1 | 6/1981 |
| WO | 8606796 A1 | 11/1986 |
| WO | 9320864 A1 | 10/1993 |
| WO | 9415660 A1 | 7/1994 |
| WO | 9855073 A1 | 12/1998 |
| WO | 9856293 A1 | 12/1998 |
| WO | 9910040 A1 | 3/1999 |
| WO | 9910049 A1 | 3/1999 |
| WO | 9962576 A1 | 12/1999 |
| WO | 0029047 A1 | 5/2000 |
| WO | 0178812 A1 | 10/2001 |
| WO | 0220073 A2 | 3/2002 |
| WO | 0226282 A2 | 4/2002 |
| WO | 2002076535 A1 | 4/2002 |
| WO | 2003097133 A1 | 4/2002 |
| WO | 02068823 A1 | 9/2002 |
| WO | 2004032994 A2 | 4/2004 |
| WO | 2004056412 A2 | 7/2004 |
| WO | 2004110526 A1 | 12/2004 |

(56) References Cited

FOREIGN PATENT DOCUMENTS

| | | | |
|---|---|---|---|
| WO | 2007066152 | A2 | 6/2007 |
| WO | 2008133702 | A1 | 11/2008 |
| WO | 2009039203 | A2 | 3/2009 |
| WO | 2009141005 | A1 | 11/2009 |
| WO | 2010022069 | A2 | 2/2010 |
| WO | 2010077279 | A1 | 7/2010 |
| WO | 2010139793 | A1 | 12/2010 |
| WO | 2011010198 | A2 | 1/2011 |
| WO | 2011031458 | A1 | 3/2011 |
| WO | 2011069935 | A2 | 6/2011 |
| WO | 2011075042 | A1 | 6/2011 |
| WO | 2011133823 | A1 | 10/2011 |
| WO | 2012073032 | A1 | 6/2012 |
| WO | 2013050535 | A2 | 4/2013 |
| WO | 2013137893 | A1 | 9/2013 |
| WO | 2013149186 | A1 | 10/2013 |
| WO | 2014029416 | A1 | 2/2014 |
| WO | 2014149357 | A1 | 9/2014 |
| WO | 2014179774 | A1 | 11/2014 |
| WO | 2015032772 | A1 | 3/2015 |
| WO | 2015048791 | A1 | 4/2015 |
| WO | 2015081337 | A2 | 6/2015 |
| WO | 2015117854 | A1 | 8/2015 |
| WO | 2015167201 | A1 | 11/2015 |
| WO | 2015177082 | A1 | 11/2015 |
| WO | 2017148855 | A1 | 9/2017 |
| WO | 2017187177 | A1 | 11/2017 |
| WO | 2021016452 | A1 | 1/2021 |

OTHER PUBLICATIONS

Lind et al. "Linear Motion Miniature Actuators." Paper presented at the 2nd Tampere International Conference on Machine Automation, Tampere, Finland (Sep. 1998).

Author Unknown "The Animas R-1000 Insulin Pump—Animas Corporation intends to exit the insulin pump businessand discontinue the manufacturing and sale of Animas® Vibe® and One Touch Ping® insulin pumps." [online], Dec. 1999 [retrieved on Jan. 8, 2019]. Retrieved from the Internet URL: http://www.animaspatientsupport.com/.

Author Unknown, CeramTec "Discover the Electro Ceramic Products CeramTec acquired from Morgan AdvancedMaterials" [online], Mar. 1, 2001 [retrieved on Jan. 8, 2019. Retrieved from the Internet URL: http://www.morgantechnicalceramics.com/.

Vaughan, M.E., "The Design, Fabrication, and Modeling of a Piezoelectric Linear Motor." Master's thesis, Virginia Polytechnic Institute and State University, VA. (2001).

Galante et al., "Design, Modeling, and Performance of a High Force Piezoelectric Inchworm Motor," Journal of Intelligent Material Systems and Structures, vol. 10, 962-972 (1999).

International Search Report and Written Opinion for International Application No. PCT/US2017/055054, mailed on Jan. 25, 2018, 13 pages.

International Search Report and Written Opinion for International Application No. PCT/US2018/045155, mailed on Oct. 15, 2018, 15 pages.

International Preliminary Report on Patentability for International Application No. PCT/US2017/034811 issued on Nov. 27, 2018, 10 pages.

International Preliminary Report on Patentability for International Patent Application No. PCT/US2017/046508, Feb. 12, 2019, 10 pages.

International Search Report and Written Opinion for International Application No. PCT/US2017/046508, mailed on Jan. 17, 2018, 14 pages.

International Search Report and Written Opinion for International Application No. PCT/US2017/046777, mailed on Dec. 13, 2017, 14 pages.

International Search Report and Written Opinion for International Application No. PCT/US2017/046737, mailed on Dec. 14, 2017, 11 pages.

International Search Report and Written Opinion for International Application No. PCT/US2017/034814, mailed on Oct. 11, 2017, 18 pages.

European Search Report and Written Opinion for the European Patent Application No. EP19177571, dated Oct. 30, 2019, 8 pages.

International Preliminary Report on Patentability for International Patent Application No. PCT/US2018/014351, dated Jul. 23, 2019, 7 pages.

International Preliminary Report on Patentability for International Patent Application No. PCT/US2017/046777, dated Feb. 19, 2019, 8 pages.

International Preliminary Report on Patentability for International Patent Application No. PCT/US2017/046737, dated Feb. 19, 2019, 8 pages.

International Preliminary Report on Patentability for International Patent Application No. PCT/US2017/055054, dated Apr. 9, 2019, 8 pages.

International Search Report and Written Opinion for Application No. PCT/US2017/034811, mailed Oct. 18, 2017, 15 pages.

EPO Search Report received in Application No. 13768938.6, dated Nov. 11, 2015, 8 pages.

International Search Report and Written Opinion for PCT Application No. PCT/US13/34674, mailed Aug. 6, 2013, 17 pages.

International Search Report and Written Opinion for International Application No. PCT/GB2007/004073, Jan. 31, 2008, 8 pages.

International Search Report and Written Opinion for International Patent Application No. PCT/US2019/063615, dated May 3, 2020, 17 pages.

International Preliminary Report on Patentability for International Patent Application No. PCT/US2018/045155, dated Feb. 14, 2020, 10 pages.

International Search Report and Written Opinion for International Patent Application No. PCT/US2019/035756, dated Jul. 31, 2019, 11 pages.

International Search Report and Written Opinion for International Patent Application No. PCT/US2022/029012, mailed Aug. 19, 2022, 12 pages.

International Search Report and Written Opinion for PCT Application No. PCT/US2019/059854, mailed Aug. 26, 2020, 15 pages.

International Search Report and Written Opinion, Application No. PCT/US2022/016713, mailed Aug. 5, 2022, 19 pages.

European Search Report and Written Opinion for European Patent Application No. EP20174878, dated Sep. 29, 2020, 4 pages.

Schott web-page image from Jul. 9, 2016, https://www.us.schott.com/pharmaceutical_packaging/english/products/cartridges.html.

International Search Report and Written Opinion for International Patent Application No. PCT/US2021/055581, dated Feb. 8, 2022, 19 pages.

International Search Report and Written Opinion for International Patent Application No. PCT/US2022/011356, dated Apr. 29, 2022, 19 pages.

* cited by examiner

LINEAR ACTIVATED DRUG DOSING PUMP SYSTEM

RELATED APPLICATIONS

This application claims the benefit of U.S. Provisional Patent Application No. 63/135,857, filed Jan. 11, 2021, the contents of which are incorporated herein by reference in their entirety.

BACKGROUND

Many conventional drug delivery systems, including, for example, wearable drug delivery devices, include a drug container, often referred to as a reservoir, that stores a liquid drug. A liquid drug stored in the reservoir may be delivered to the user by expelling the drug from the reservoir using a driven plunger, for example, a leadscrew driven plunger. In present known embodiments, the plunger is typically disposed directly within the reservoir such that the reservoir and the drive comprise a single unit. As result, the reservoir requires a large cross-sectional area, such as to be able to hold the device's entire supply of the drug. The large cross-sectional area has the disadvantage of increasing the minimum dosing increment for a given axial displacement of the plunger. In addition, the larger cross-sectional area requires a larger diameter plunger which leads to more drag and friction on the interior sealing surfaces of the reservoir, thereby increasing the force required to achieve a given pressure and, as a result, requiring a larger, more powerful motor to drive the plunger. A need therefore exists for a configuration which achieves the same effective delivery of the drug, but with a container having a smaller cross-sectional area to overcome the identified deficiencies.

DETAILED DESCRIPTION

Figure 1:
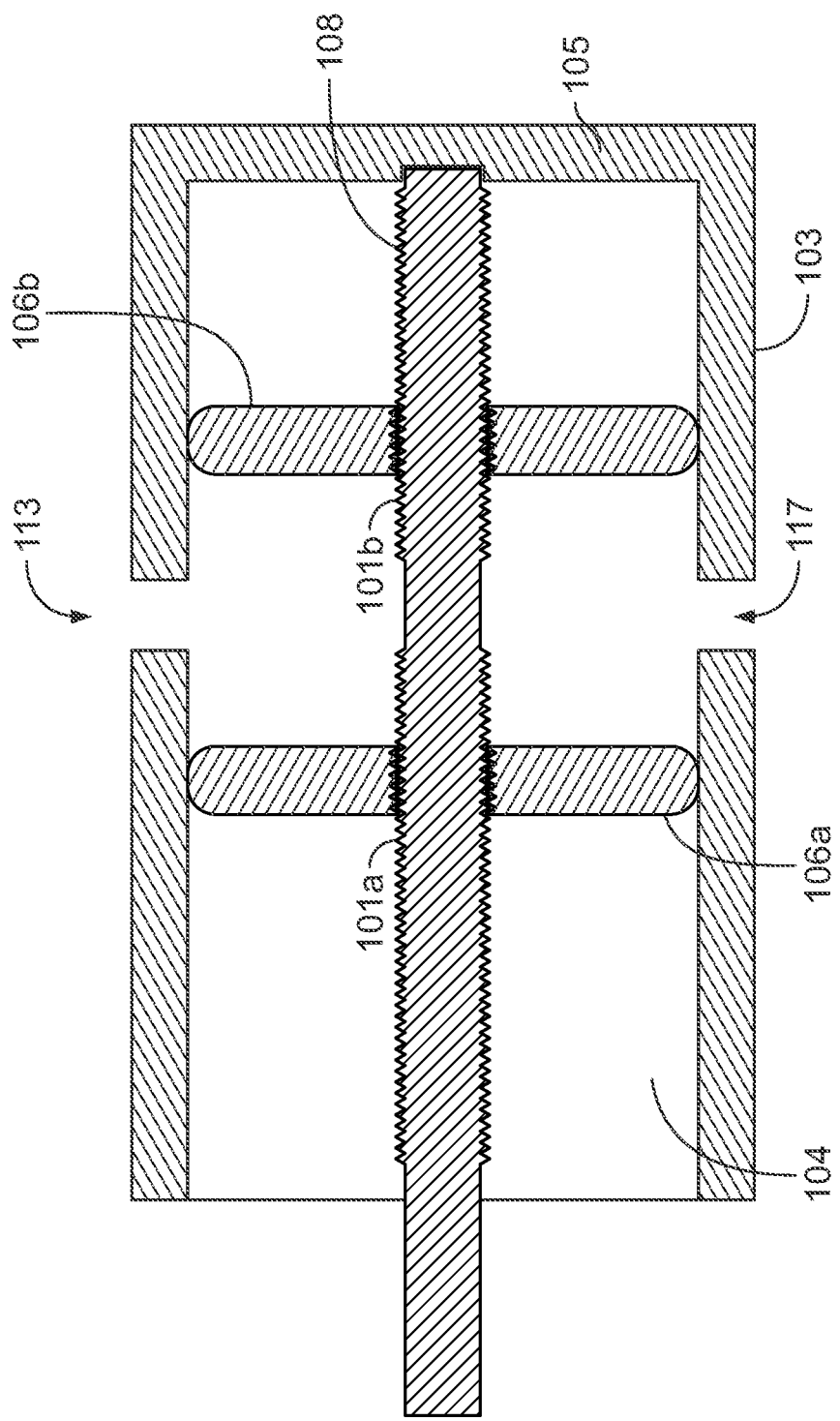
FIG. 1 is a cross-sectional view of the pump chamber of a first embodiment of the invention in which dual plungers are used.

This disclosure presents various systems, components and methods for moving a liquid, typically a liquid drug, such as insulin, from a liquid reservoir to a patient interface, typically a needle or cannula. Each of the systems, components and methods disclosed herein provides one or more advantages over conventional, prior art systems components and methods.

In various embodiments of the invention, the reservoir is separated from the pump chamber but connected thereto via a first conduit having a one-way valve such as to allow flow of the liquid from the reservoir into the pump chamber but not from the pump chamber back into the reservoir. In preferred embodiments of the invention, the reservoir may be a collapsible container; however, in other embodiments, the reservoir may be rigid.

In one embodiment of the invention, the pump chamber has disposed therein a pair of plungers driven by a leadscrew having both left-hand and right-hand threads such that, when the leadscrew rotates in one direction, the plungers move toward each other and, when the leadscrew is rotated in the opposite direction, the plungers move away from each other.

The first conduit connecting the pump chamber to the reservoir connects to the pump chamber between the plungers, preferably in the middle of the pump chamber. Thereby, the movement of the plungers away from each other creates a negative pressure in the pump chamber which draws the liquid from the reservoir through the first conduit and into the pump chamber. The leadscrew is thus rotated in a direction such as to move the plungers away from each other to draw the liquid into the pump chamber. The liquid is prevented from returning to the reservoir by the one-way valve disposed in the conduit between the reservoir and the pump chamber.

Once the pump chamber is filled with an appropriate quantity of the liquid, the leadscrew is rotated in a second, opposite direction, thereby driving the plungers toward each other. A second conduit connected to the pump chamber between the plungers connects the pump chamber to a patient interface, typically a needle. Thus, motion of the plungers toward each other causes a movement of the liquid through the second conduit to the patient. The second conduit is also fitted with a one-way valve such that the suction created by the motion of the plungers away from each other to draw the liquid from the reservoir into the pump chamber does not also draw fluids from the patient through the patient interface and into the pump chamber.

In a second embodiment of the invention, the pump chamber is fitted with a single plunger driven by a leadscrew. Suction is created to draw the liquid into the pump chamber by motion of the plunger away from a closed end of the pump chamber by rotation of the leadscrew in a first direction. In this embodiment, it can be seen that the first conduit connecting the reservoir to the pump chamber must be connected to the pump chamber near, if not directly adjacent to or through, the closed end of the pump chamber.

The liquid is then pushed out to the second conduit to the patient interface by motion of the plunger toward the closed end, caused by rotation of the leadscrew in the opposite direction. It should also be realized that the second conduit connecting the pump chamber to the patient interface must be connected to the pump chamber near or through the closed end. In the second embodiment of the invention, both the first and second conduits are also fitted with a one-way valve so as to prevent the liquid in the pump chamber from returning to the reservoir and to prevent fluids from the patient from entering the pump chamber.

In one embodiment of the invention, the rotation of the leadscrew can be driven by a drive coupled to the leadscrew either directly or via gearing.

The improved liquid delivery system disclosed herein thus addresses the problems identified in the Background section. By separating the reservoir from the pump chamber, the pump chamber can be configured with a cross-sectional area of any size, preferably small enough to overcome the difficulties associated with the larger diameter cross-sectional areas of conventional, prior art devices.

FIG. 1 is a cross-sectional view of a first embodiment of the pump chamber 104 of the present invention. Pump chamber 104 consists of an open-ended container comprising sidewall 103 and endcap 105. Sidewall 103 may comprise a tube-like structure having a cross-sectional shape. In some instances, sidewall 103 and endcap 105 may be formed as an integral unit, however, in other instances, sidewall 103 and endcap 105 may be formed separately and joined together. Sidewall 103 and endcap 105 may be composed of, for example, glass, polypropylene or any other bio- or drug-compatible material. In certain embodiments, endcap 105 may be absent, with pump chamber 104 being open at both ends.

Sidewall 103 has formed therein inlet port 113 and outlet port 117. Inlet port 113 may connect, via a conduit, to a reservoir which may hold a quantity of a liquid. Outlet port 117 may connect to a patient interface for delivery of the liquid to a patient. Preferably, inlet port 113 and outlet port 117 will be located midway between plungers 106a, 106b, such that when plungers 106a, 106b are in a touching, face-to-face configuration, access to both inlet port 113 and outlet port 117 are fully or partially blocked. This serves as a safety feature to prevent free-flow of the liquid from the reservoir to the patient interface in the event of valve failure. In preferred embodiments of the invention, inlet port 113 and outlet port 117 are located opposite each other along sidewall 103; however, in other embodiments, inlet port 113 and outlet port 117 may be positioned at any convenient location along sidewall 103.

Disposed within pump chamber 104 are plungers 106a, 106b. In some embodiments, plungers 106a, 106b may be composed of, for example, a butyl rubber or silicon rubber material or any other commonly known drug-compatible material. In other embodiments, plungers 106a, 106b may be composed of a polycarbonate derivative or cyclic olefin polymer (COP), in which case, plungers 106a, 106b may be surrounded by one or more O-rings composed of butyl rubber or silicon rubber. In some embodiments, plungers 106a, 106b are configured with flat facing surfaces. In other embodiments, other shapes may be used but preferably the plungers 106a, 106b will have mating shapes, for example, one concave and one convex, such that when plungers 106a, 106b are together, no volume remains therebetween. The faces of plungers 106a, 106b may be configured with channels to direct the movement of the liquid in a desired direction.

Plungers 106a, 106b are connected by leadscrew 108. In certain embodiments, leadscrew 108 may be composed of stainless steel, polypropylene, or any other well-known bio- or drug-compatible material. In preferred embodiments, leadscrew 108 comprises both left-handed threading 101a and right-handed threading 101b as an interface with plungers 106a, 106b, such that rotation of leadscrew 108 in a first direction will cause plungers 106a, 106b to move toward each other along the longitudinal axis of pump chamber 104 until touching, and such that rotation of leadscrew 108 in a second, opposite direction will cause plungers 106a, 106b to move away from each other along the longitudinal axis of pump chamber 104.

Figure 2:
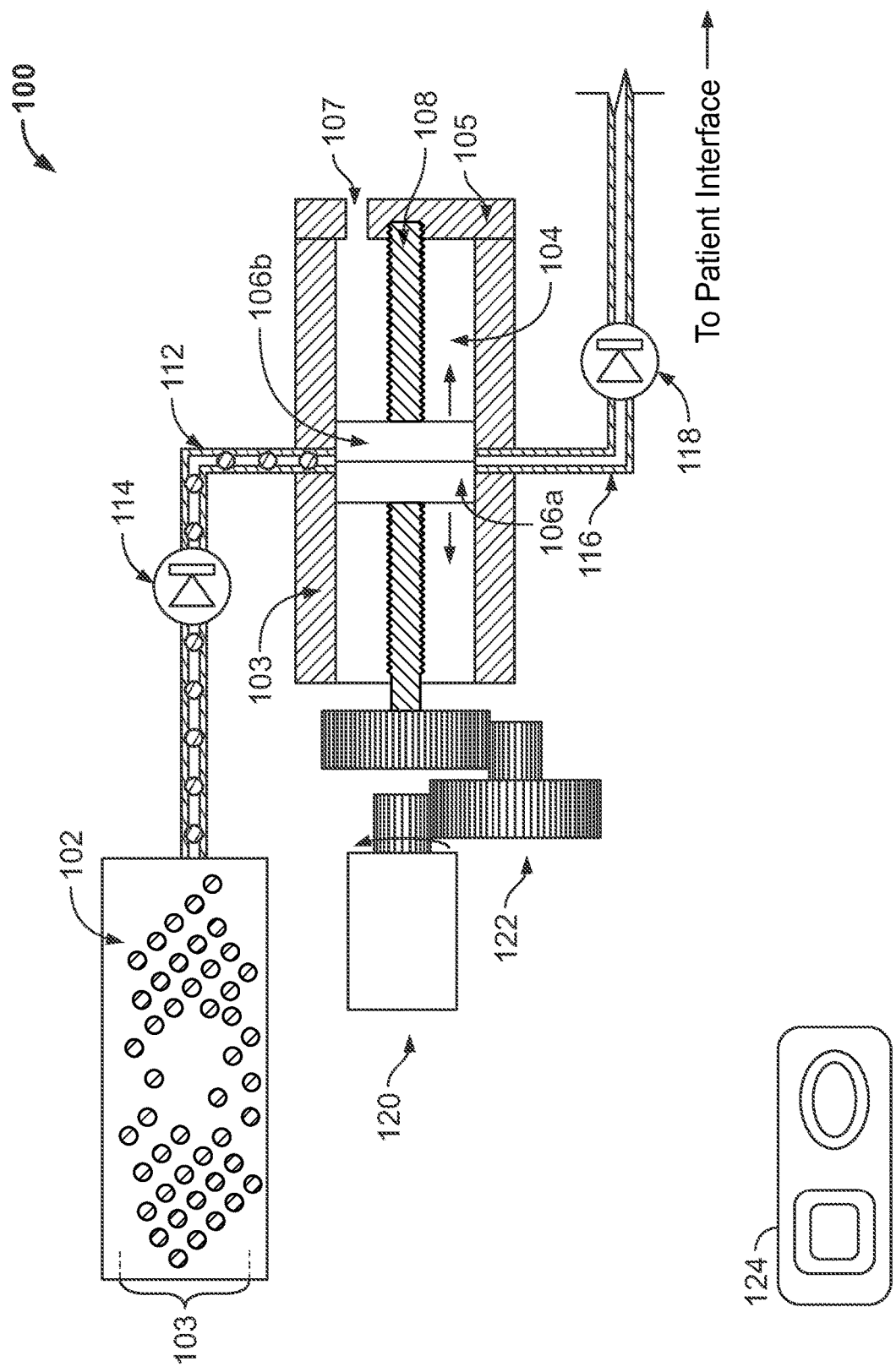
FIG. 2 is a schematic view of the pump system of the present invention in a first state in which the pump chamber is empty and the plungers are in a touching, face-to-face configuration.

FIG. 2 is a schematic representation of the first embodiment of the invention in which a linear-actuated drug dosing system 100 comprises two plungers 106a, 106b disposed in pump chamber 104. Reservoir 102 may contain a quantity of a liquid 103, for example, a drug in liquid form. In some embodiments of the invention, reservoir 102 may be rigid, while, in other embodiments, the reservoir 102 may be flexible and collapsible to eliminate the need for a vent in the reservoir to prevent a vacuum performing therein as liquid 103 is drawn from reservoir 102 into pump chamber 104. In some embodiments, reservoir 102 may be composed of high-density polyethylene or, in other embodiments, ACLAR®.

Reservoir 102 is fluidly coupled to pump chamber 104 through inlet port 113 via inlet conduit 112. Likewise, pump chamber 104 is fluidly coupled to a patient interface through outlet port 117 via outlet conduit 116. Inlet conduit 112 and outlet conduit 116 may be composed of, for example, stainless steel or Teflon and may be, for example, tubing of the type of which hypodermic needles are constructed. One-way valve 114 prevents liquid 103, which has entered the pump chamber 104, from returning to reservoir 102. The patient interface may be, for example, a needle, a needle conduit or tubing that can be used as a fluid path to deliver the liquid 103 to a patient. One-way valve 118 prevents fluids from the patient from being drawn into pump chamber 104 as liquid 103 is being drawn into pump chamber 104 from reservoir 102.

Plungers 106a, 106b are disposed within the pump chamber 104 and may be sealed against the inner surface of sidewall 103 of pump chamber 104. It should be noted that the cross-sectional shape of pump chamber 104 may be any shape, including circular; however, in preferred embodiments, the cross-sectional shape of pump chamber 104 may be any one of a number of non-circular shapes, preferred examples of which are shown as reference number 124 in FIG. 2. The non-circular, cross-sectional shape of pump chamber 104 is desirable to prevent plungers 106a, 106b from rotating within pump chamber 104 when leadscrew 108 is rotated. Non-rotation of plungers 106a, 106b is necessary to enable the movement of the plungers 106a, 106b along the longitudinal axis of pump chamber 104 driven by the rotation of leadscrew 108 as it rotates in either direction.

Leadscrew 108 may be driven by any one of a number of known methods. In one embodiment, the drive source may be motor 120, which may be coupled to leadscrew 108 via gearing 122. Leadscrew 108 is, in this embodiment of the invention, configured with both left-hand and right-hand threads, as shown in the figure. Thus, rotation of leadscrew 108 in a first direction (e.g. clockwise) will cause plungers 106a, 106b to move toward each other, while rotation of leadscrew 108 in an opposite direction (e.g. counter-clockwise) will cause plungers 106a, 106b to move away from each other.

Motor 120 may be coupled to leadscrew 108 via gearing 122. In some embodiments of the invention, gearing 122 may be a planetary gear system, but any configuration of coupling between the motor 120 and leadscrew 108 may be used, including a direct connection. Motor 120 may be a continuous motion motor or stepper motor and is preferably controlled by a software-driven controller.

In alternate embodiments of the invention, a nitinol wire drive (not shown) may be used to drive gearing 122 in lieu of motor 120 and may be coupled to leadscrew 108 via gearing 122.

FIG. 2 shows the device in a static state, with plungers 106a, 106b shown together. This is a likely state of the device just subsequent to the delivery of one or more units of liquid 103 and in ready state for filling of the pump chamber 104 with additional liquid 103 from reservoir 102.

Figure 3:
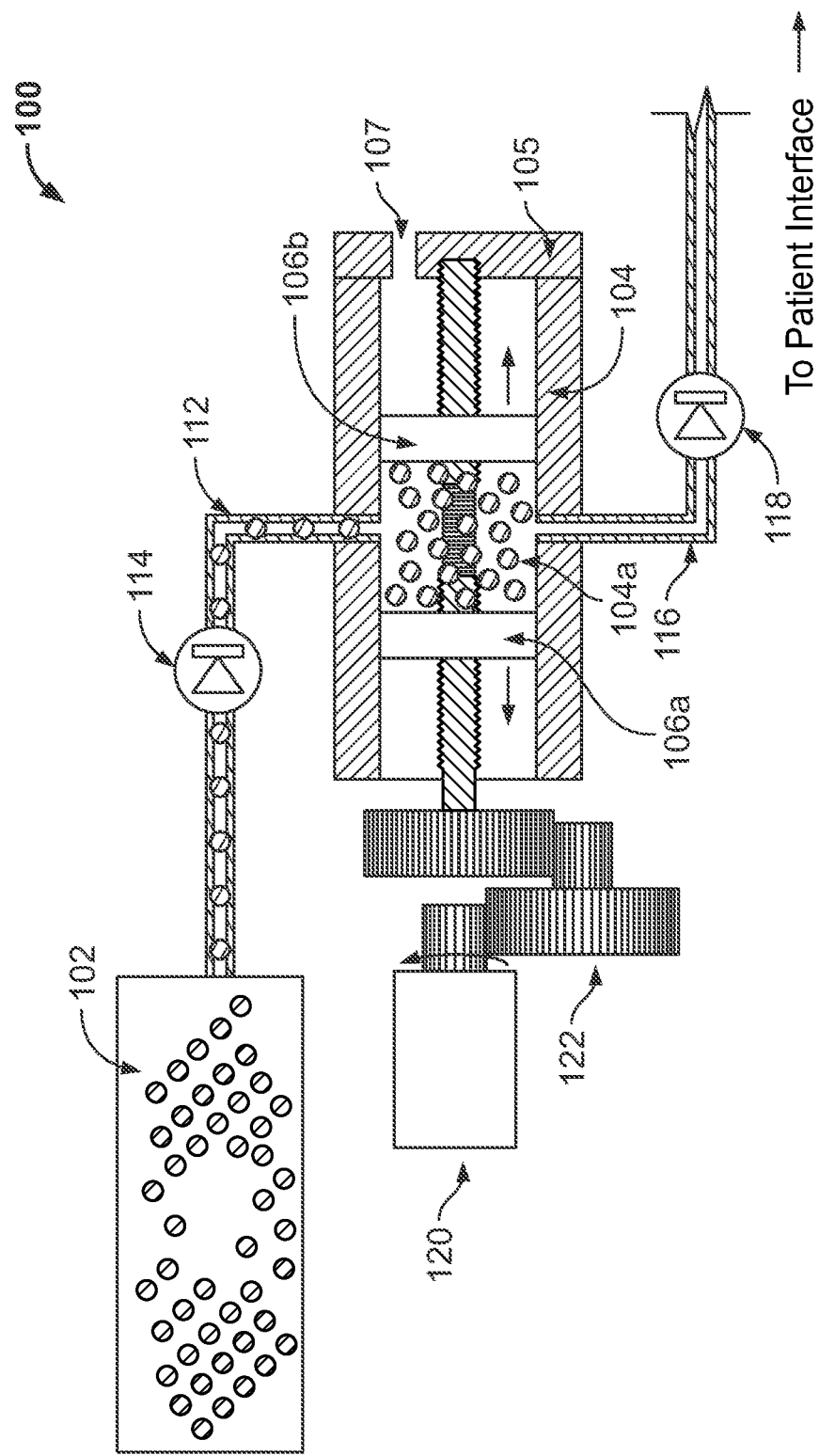
FIG. 3 is a schematic view of the pump system of the present invention in a second state in which the plungers have moved away from each other to draw a liquid from the reservoir into the pump chamber.

FIG. 3 is a schematic diagram showing the process of drawing liquid 103 from reservoir 102 into pump chamber 104. Motor 120 may be activated in a direction such as to cause plungers 106a, 106b to move away from each other as shown by the arrows in pump chamber 104. Movement of plungers 106a, 106b away from each other causes a negative pressure to form in the volume 104a between the plungers 106a, 106b, which serves to draw liquid 103 through conduit 112, into pump chamber 104 and, more specifically, into volume 104a between plungers 106a, 106b. One-way valve 118 prevents fluids from the patient from being drawn through conduit 116 and into volume 104a of pump chamber 104 as plungers 106a, 106b create the negative pressure within volume 104a as they move away from each other.

Pump chamber 104 may be configured with a vent 107 on end wall 105 of pump chamber 104 to allow air between plunger 106b and end wall 105 of pump chamber 104 to escape as plunger 106b is moved toward end wall 105, and to allow air to enter the space between end wall 105 and plunger 106b when plunger 106b is moved in the opposite direction, away from end wall 105.

Figure 4:
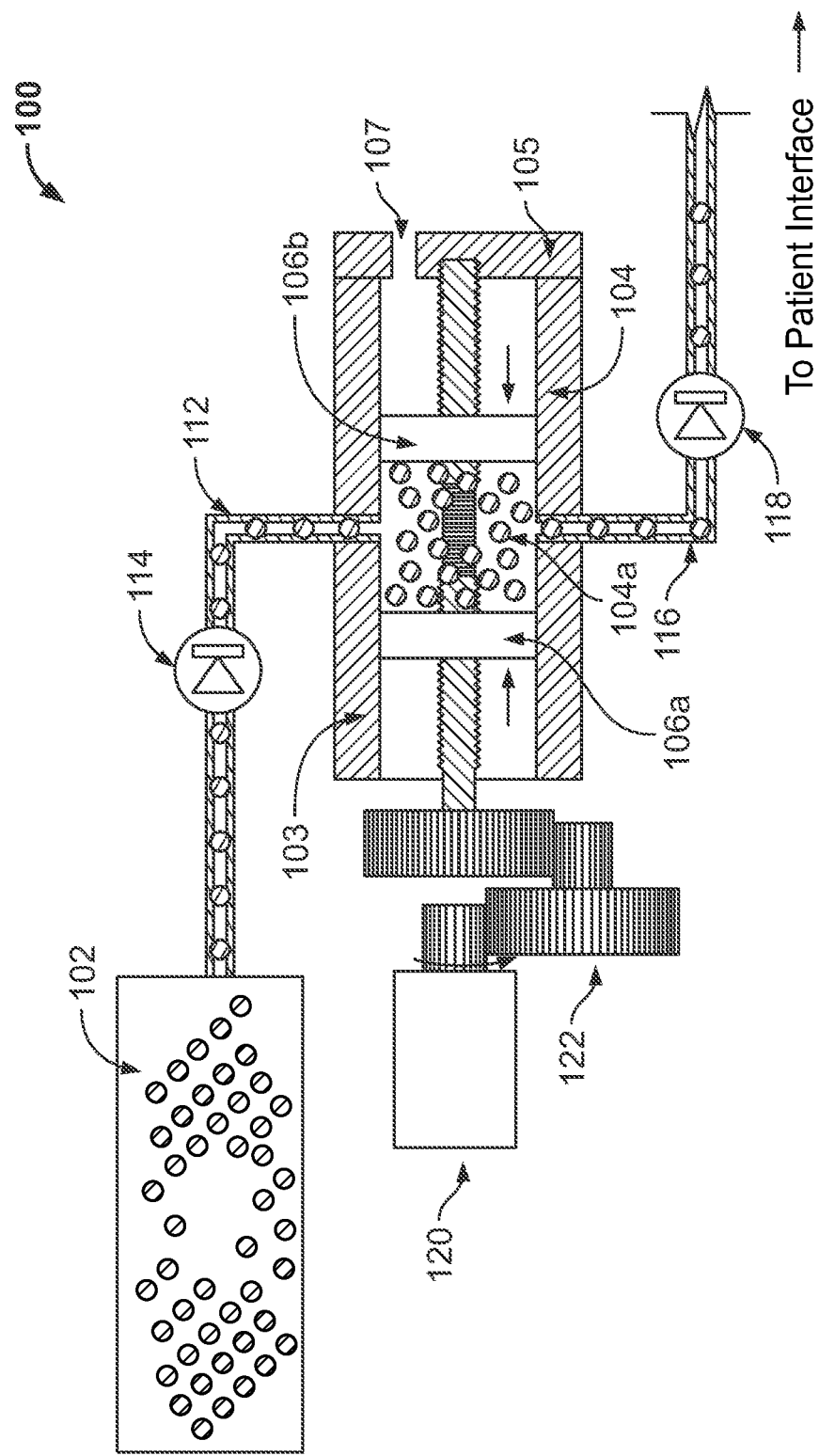
FIG. 4 is a schematic view of the pump system of the present invention in a third state in which the plungers are moving toward each other to force the liquid from the pump chamber to the patient interface.

FIG. 4 is a schematic diagram illustrating the process of pumping liquid 103 from volume 104a through conduit 116 to the patient interface. Motor 120 may be rotated in a direction opposite the direction of rotation used to draw liquid 103 into volume 104a such as to move plungers 106a, 106b toward each other as shown by the arrows in FIG. 4, thereby creating a positive pressure within volume 104a. The movement of plungers 106a, 106b toward each other reduces the size of volume 104a and forces liquid 103 into the conduit 116 and out to the patient through the patient interface. One-way valve 114 prevents liquid 103 from returning to reservoir 102 as plungers 106a, 106b move toward each other, ensuring that all of liquid 103 within volume 104a is forced into conduit 116.

Figure 5:
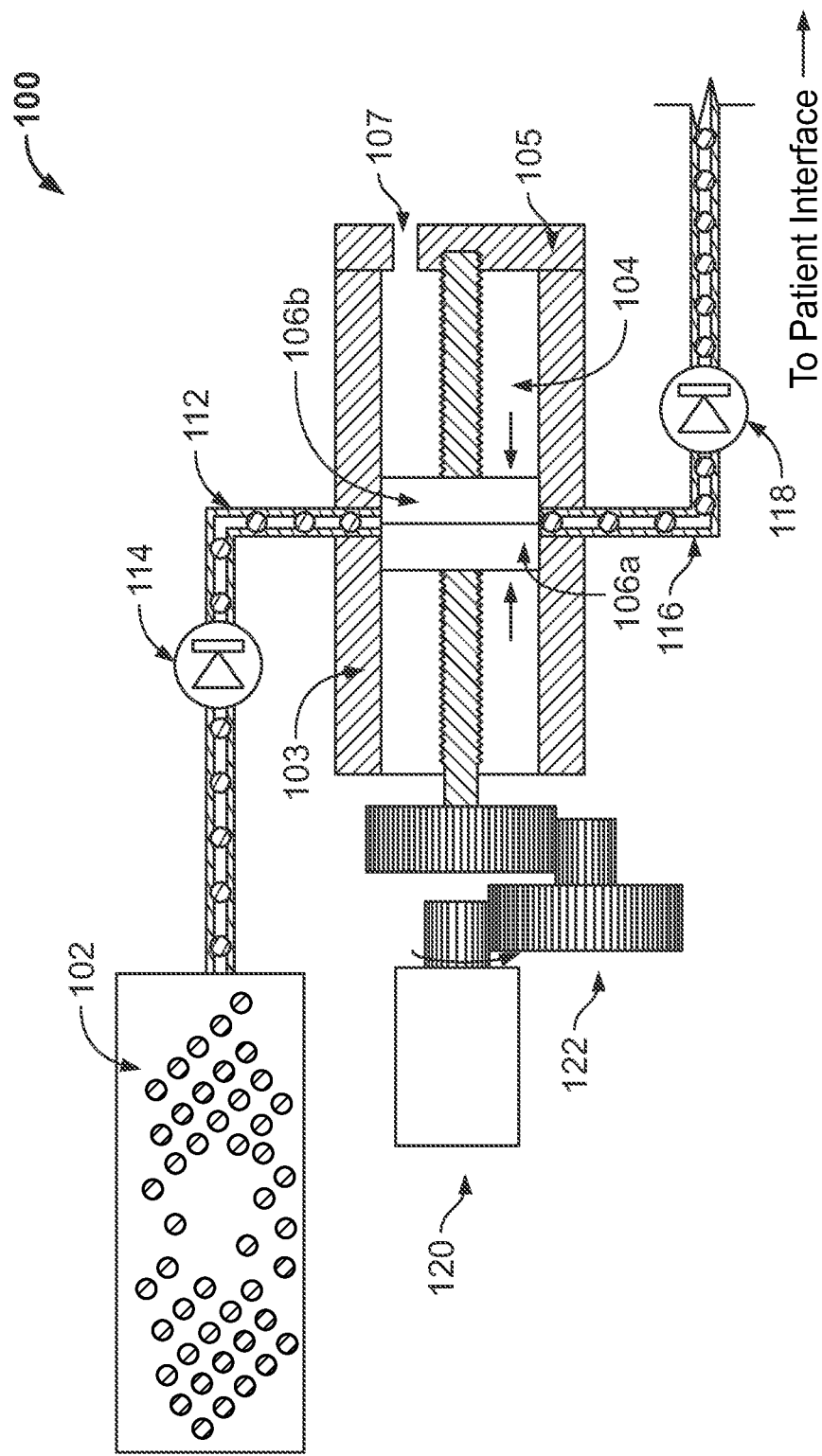
FIG. 5 is a schematic view of the pump system of the present invention in a fourth state in which all the liquid has been forced from the pump chamber toward the patient interface.

Once plungers 106a, 106b have reached a position where they are touching one another, as shown in FIG. 5, all, or most of liquid 103 within volume 104a will have been forced into conduit 116 to the patient interface. Plungers 106a, 106b do not necessarily need to touch each other to complete a cycle of liquid delivery. However, to reduce the amount of residual liquid within the system, and hence reduce the amount of wasted liquid at the end of usage of system 100, plungers 106a, 106b preferably come into contact at the end of each cycle of liquid delivery, or alternatively, at a final cycle of drug delivery when all or nearly all of liquid drug has been dispensed from reservoir 102. Having plungers 106a, 106b come into contact only at a final cycle of drug delivery will reduce the impact that plungers 106a, 106b have on constituents of the liquid (e.g., molecules of insulin) during each cycle of liquid delivery, thereby prolonging the life or effectiveness of the liquid (e.g., protein molecules within the liquid).

It should be noted that conduits 112, 116 interface with pump chamber 104 in the volume 104a between plunger 106a, 106b. In preferred embodiments of the invention, conduits 112 and 116 will connect to volume 104a midway between the largest distance that plunger 106a, 106b can travel from each other, or, in other words, at the point where plungers 106a, 106b meet when they are touching each other or at the end of a cycle, such that when plungers 106a, 106b are in the position shown in FIG. 2, both inlet port 113 and outlet port 117 are blocked.

It should be noted that multiple units of liquid 103 may be drawn into volume 104a at a single time and may be dispensed in separate units to the patient. It is not necessary that volume 104a be emptied each time that a unit of liquid 103 is delivered to the patient.

It should be further noted that the quantity of liquid 103 drawn into volume 104a is dependent upon the distance between plungers 106a, 106b at their furthest point of travel away from each other. Thus, the quantity of liquid 103 drawn into volume 104a can be controlled by varying the distance between plungers 106a, 106b. Larger distances between plungers 106a, 106b will result in a larger volume 104a and, thus, a larger quantity of liquid 103, while smaller distances will result a smaller volume 104a and a smaller quantity of liquid 103 being drawn into volume 104a.

One advantage of the dual-plunger design is that the system is balanced axially such that it does not induce a thrust onto the bearing support (i.e. the portion where the leadscrew 108 interfaces with end wall 105 of pump chamber 104. This translates into less frictional losses in the system. One further advantage is that the design prevents the free flow of liquid 103 directly from reservoir 102 to the patient when plungers 106a, 106 block inlet port 113 and outlet port 117. This can be a safety mechanism in the case of an over-pressure situation or if squeezing of the device forces liquid 103 out of reservoir 102.

Various other methods are possible in this embodiment of the invention for measuring the size of the volume 104a between plungers 106a, 106b, and thus the quantity of liquid 103 which is drawn into volume 104a. In one embodiment of the invention, the size of volume 104a may be determined algorithmically by calculation based on the number of turns of leadscrew 108 and the known distance that plungers 106a, 106b travel based on the determined number of turns. Other embodiments of determining the size of volume 104a utilizing sensors will now be discussed.

Figure 6A:
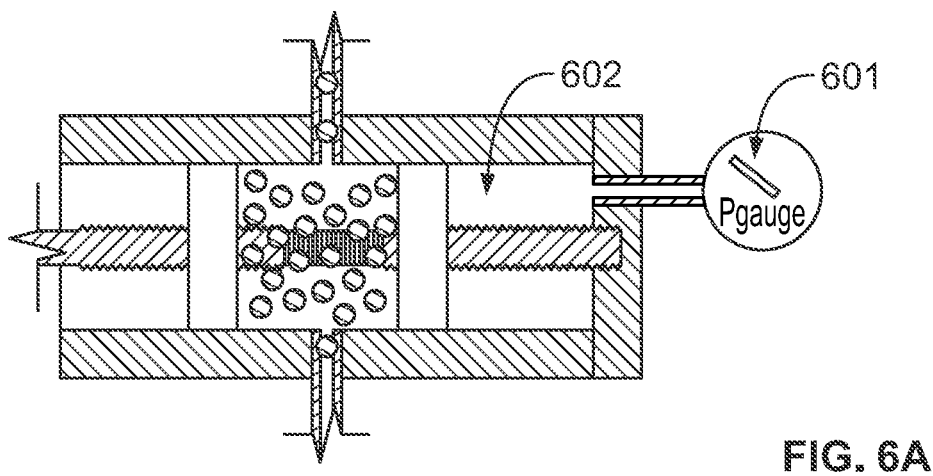
FIGS. 6(A-C) show three variations of the pump system of the present invention in which sensors are used to determine the volume of the liquid which has been drawn into the pump chamber.

FIG. 6A shows one embodiment using a pressure gauge to calculate a volume change in the pump chamber 104 using the ideal gas law equation $PV=nRT$. A gas pressure gauge 601 may be configured to interface with pump chamber 104 through vent 107 in end wall 105. Using air pressure in area 602 as measured by pressure gauge 601, the change in the position of the plungers, and thus changes in the quantity of liquid 103 in volume 104a, can be derived from a measurement of the change in air pressure within area 602. The actual quantity of liquid 103 drawn into volume 104a may be further dependent on other factors, for example, the size of conduit 112.

Figure 6B:
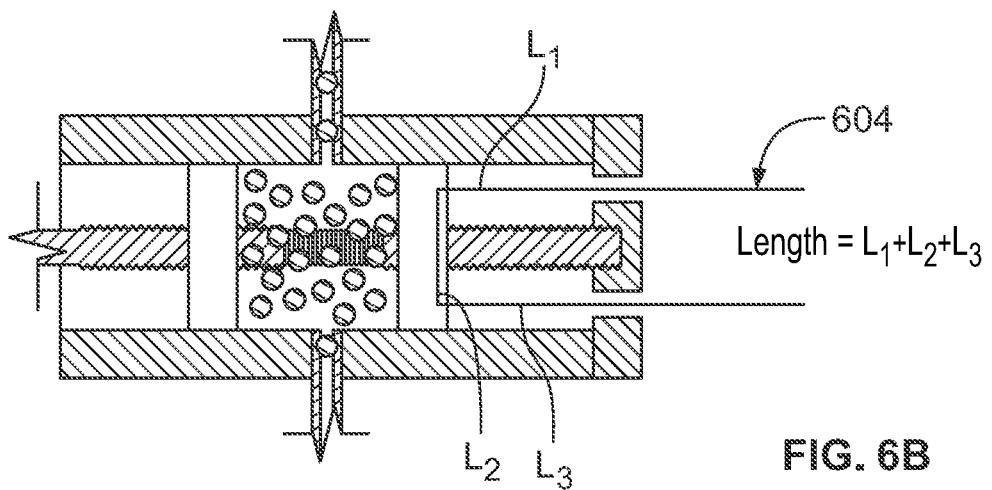

FIG. 6B shows a second embodiment utilizing a three-segment custom linear encoder using simple analog techniques. In this embodiment, change in the length (length=$l_1$+$l_2$+$l_3$) of conductive bar or wire 604 can alter its resistance/current and can be calibrated to the position of plunger 106b. The position of plunger 106a can thereafter be inferred from the position of plunger 106b.

Figure 6C:
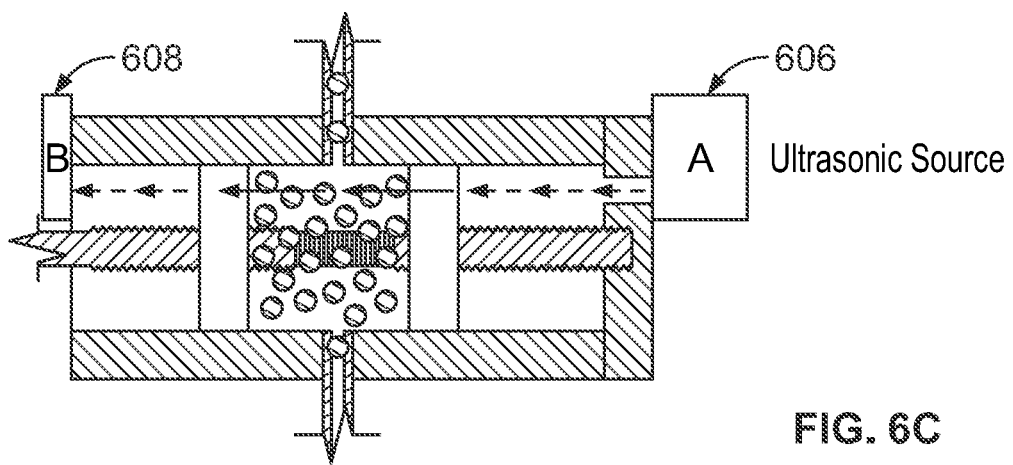

FIG. 6C shows yet another embodiment utilizing an ultrasonic sensor. An ultrasonic source 606 may direct a beam of ultrasonic sound through vent 107. The speed of sound through various media (i.e., air→plastic→aqueous spolution→plastic→air) is known and, as such, based on timing, with the known distance between the ultrasonic source 606 and an ultrasonic detector 608, a quantity of the liquid 103 can be inferred.

Figure 7:
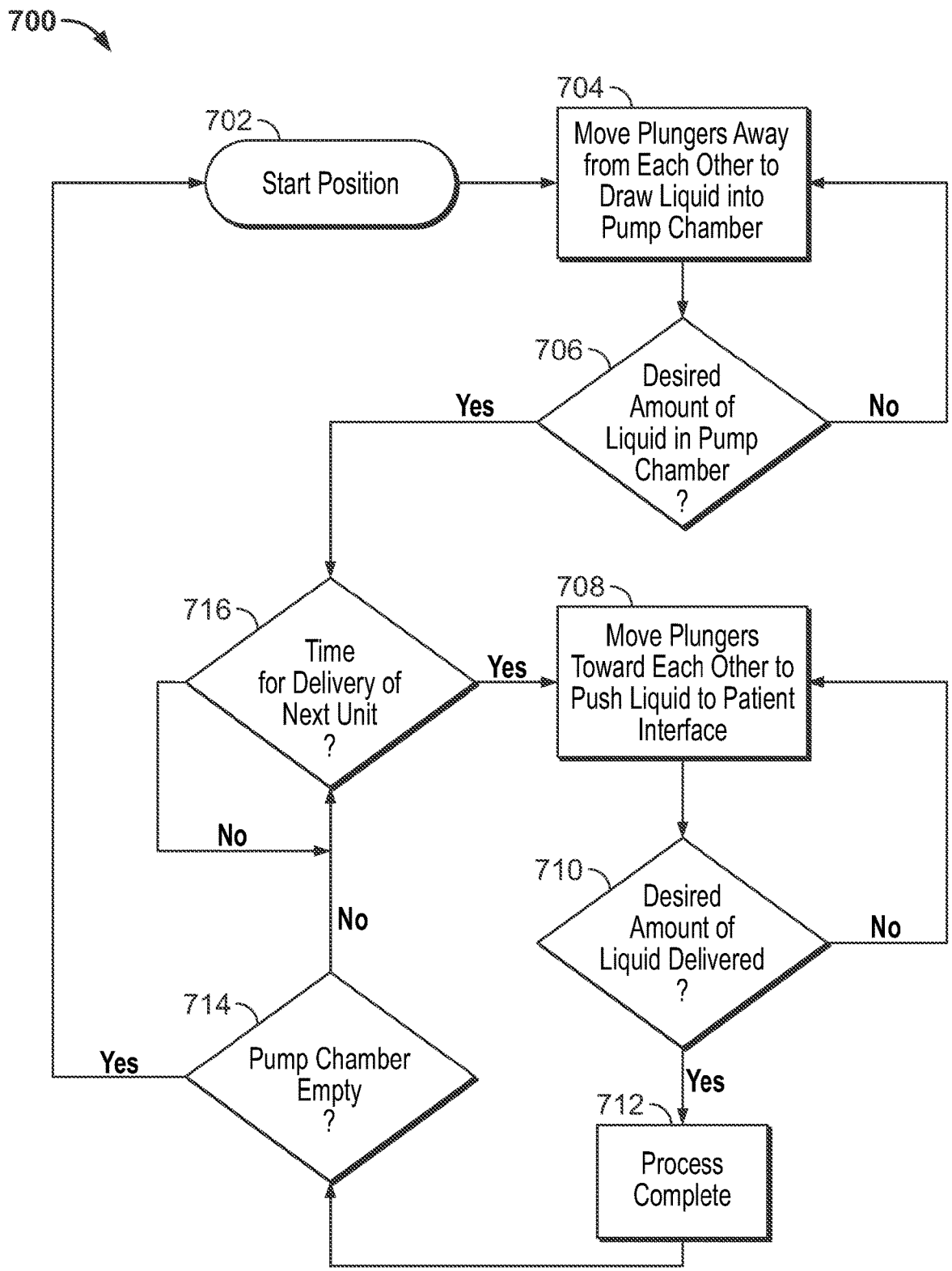
FIG. 7 is a flowchart showing the process by which one or multiple units of the liquid are moved from the reservoir to the patient interface.

FIG. 7 shows a flowchart showing process 700 for delivery of liquid 103 from the reservoir 102 to the patient interface. The system 100 begins from a start position 702. The start position is preferably the position wherein the plungers 106a, 106b are in a touching, face-to-face configuration such that volume 104a is reduced to virtually zero.

At block 704, the plungers are moved apart by turning of leadscrew 108 and liquid 103 is drawn from reservoir 102 into the volume 104a between plungers 106a and 106b. At block 706, it is determined whether the desired quantity of liquid 103 has been drawn into volume 104a of pump chamber 104 and, if not, control is returned to block 704, where the plungers 106a, 106b continue to move away from each other until the desired quantity of liquid 103 is present in volume 104a. The determination of whether the desired quantity of liquid 103 has been drawn into volume 104a may be made algorithmically by calculating, for example, the number of turns of leadscrew 108 and its relationship to the size of volume 104a or with the assistance of one of the sensor arrangements shown in FIGS. 6(A-C), or through the use of any other sensor arrangement.

At block 716 it is determined if it is time for the delivery of the additional units of liquid 103 to the patient. If so, control is sent to block 708 and if not, system 100 loops at decision point 716 until triggered. The delivery of additional units of liquid 103 could be triggered automatically, for example, by a periodic timer, by manual initiation of the delivery by the patient, or by any other means, such as through an analysis of input received from sensors regarding the current condition of the patient.

At block 708, the movement of plungers 106a, 106b toward each other is initiated by rotation of leadscrew 108 in an opposite direction, such as to force a quantity of liquid 103 from volume 104a and into conduit 116, and from there to the patient interface. At 710 it is determined if the quantity so far delivered to the patient interface comprises the desired quantity and, if not, control returns to 708, where the plungers continue to move toward each other to push a further quantity of liquid 103 to the patient interface. At 710, if the desired quantity of liquid 103 has been delivered to the patient interface, the process is complete at 712.

At decision point 714, it is determined if the volume 104a is empty, that is, the last quantity of liquid 103 has been delivered to the patient. If volume 104a is empty, control returns to start position 702 and the process repeats with the loading of an additional quantity of liquid 103 from reservoir 102 to volume 104a. If volume 104a is not empty, control returns to decision point 716, where the process loops until the delivery of the next unit of liquid 103 is triggered.

Note that the end position of the plungers when the pump chamber is empty at block 712 is the same as start position at 702, wherein the plungers are in a touching, face-to-face configuration and are thereby ready to draw the next quantity of liquid 103 into volume 104a.

The second embodiment of the invention has components similar to the first embodiment in configuration and composition and operates in a similar manner. As such, the description of the second embodiment has been condensed for brevity and like reference numerals have been used for like components.

Figure 8:
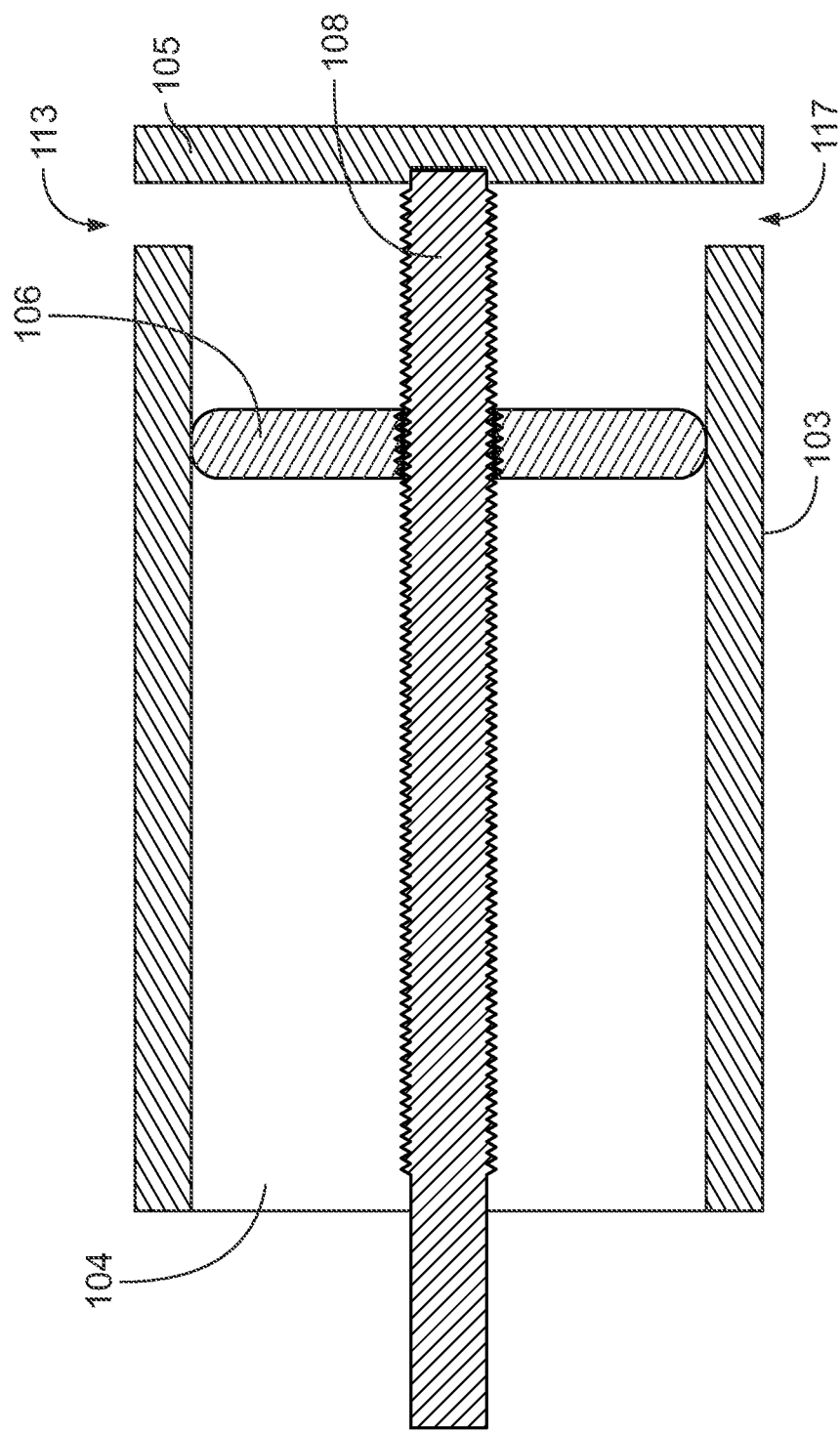
FIG. 8 is a cross-sectional view of the pump chamber of a second embodiment of the invention in which a single plunger is used.

FIG. 8 is a cross-sectional view of a second embodiment of the pump chamber 104 of the present invention in which only a single plunger 106 is used. Rotation of leadscrew 108 in a first direction moves plunger 106 toward end wall 105, while movement of the leadscrew 108 in a second, opposite direction moves plunger 106 away from end wall 105. Inlet port 113 and outlet port 117 are preferably located adjacent end wall 105, such that movement of the plunger 106 toward the end wall forces any liquid within the pump chamber 104 into the output conduit 117. Otherwise, the components and materials of the second embodiment of the pump chamber are identical to that of the first embodiment shown in FIG. 1.

Figure 9:
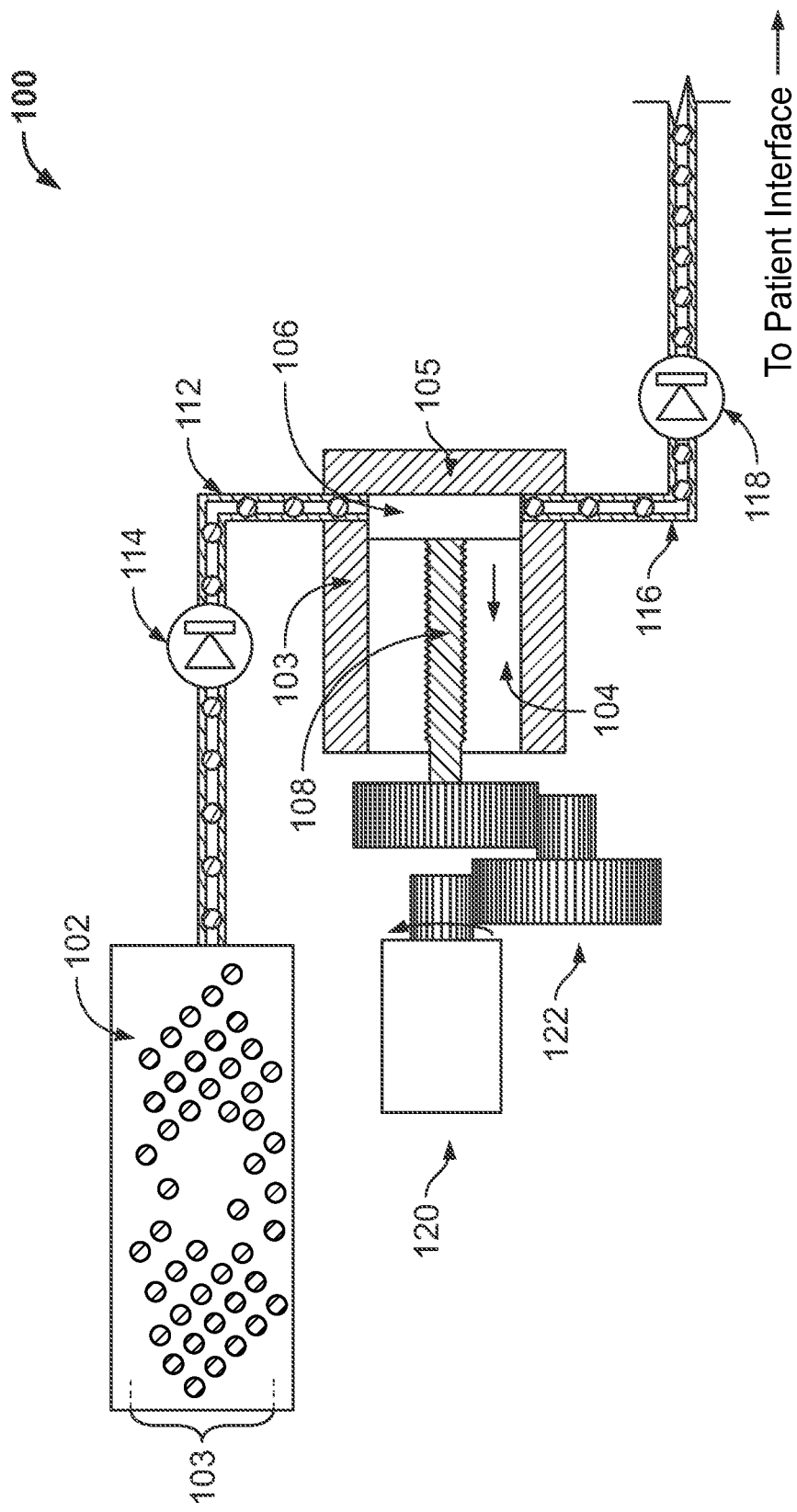
FIG. 9 is a schematic view of the second embodiment of the pump system of the present invention in a first state in which the pump chamber is empty and the plunger is touching the end wall of the pump chamber.

FIG. 9 is a schematic representation of the second embodiment of the invention in which a linear-actuated drug dosing system 100 comprises a single plunger 106 disposed in pump chamber 104.

Reservoir 102 is fluidly coupled to pump chamber 104 through inlet port 113 via inlet conduit 112. Likewise, pump chamber 104 is fluidly coupled to a patient interface through outlet port 117 via outlet conduit 116. One-way valve 114 prevents liquid 103 which has entered the pump chamber 104, from returning to reservoir 102.

One-way valve 118 prevents fluids from the patient from being drawn into pump chamber 104 as liquid 103 as being drawn into pump chamber 104 from reservoir 102.

Plunger 106 is disposed within the pump chamber 104 and may be sealed against the inner surface sidewall 103 of pump chamber 104. Leadscrew 108 may be driven by any one of a number of known methods. In one embodiment, the drive source may be motor 120, which is coupled to leadscrew 108 via gearing 122. Leadscrew 108 is, in this embodiment of the invention, configured with a single threading, as shown in the figure. Thus, rotation of leadscrew 108 in a first direction (e.g. clockwise) will cause plunger 106 to move toward end wall 105, while rotation of leadscrew 108 in an opposite direction (e.g. counter-clockwise) will cause plunger 106 to move away from end wall 105.

Motor 120 may be coupled to leadscrew 108 via gearing 122 to drive leadscrew 108 in either rotational direction.

FIG. 9 shows the device in a static state, with plunger 106 shown adjacent end wall 105 and blocking inlet port 113 and outlet port 117.

Figure 10:
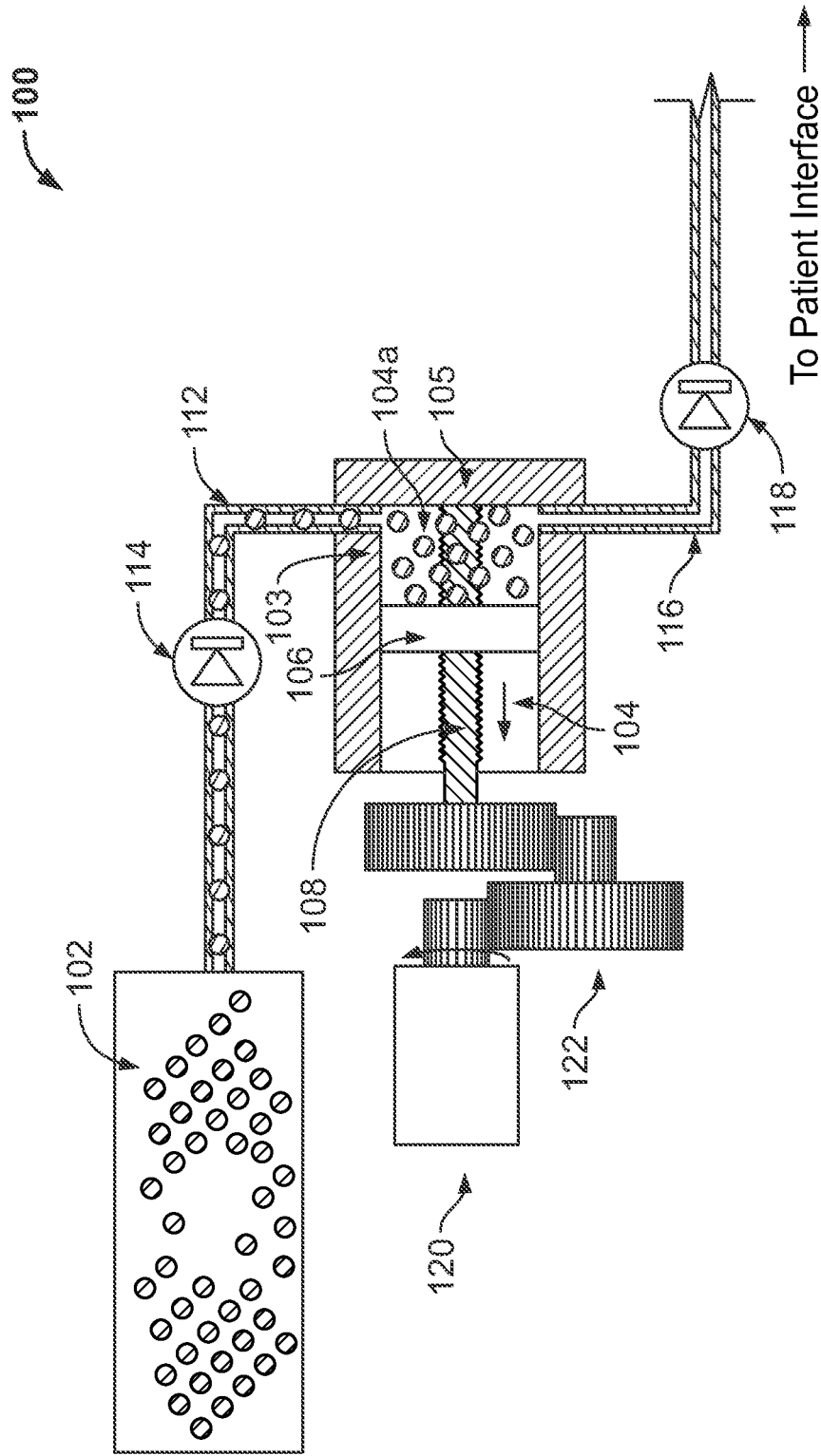
FIG. 10 is a schematic view of the second embodiment of the pump system of the present invention in a second state in which the plunger has moved away from the end wall to draw a liquid from the reservoir into the pump chamber.

FIG. 10 is a schematic diagram showing the process of drawing liquid 103 from reservoir 102 into pump chamber 104. Motor 120 may be activated in a direction such as to cause plunger 106 to move away from end wall 105 as shown by the arrow in pump chamber 104. Movement of plunger 106 away from end wall 105 causes a negative pressure to form in the volume 104a between the plunger and end wall 105, which serves to draw liquid 103 through conduit 112, into pump chamber 104 and, more specifically, into volume 104a between plunger 106 and end wall 105. One-way valve 118 prevents fluids from the patient from being drawn through conduit 116 and into volume 104a as plunger 106 creates the negative pressure within volume 104a as it moves away from end wall 105.

Figure 11:
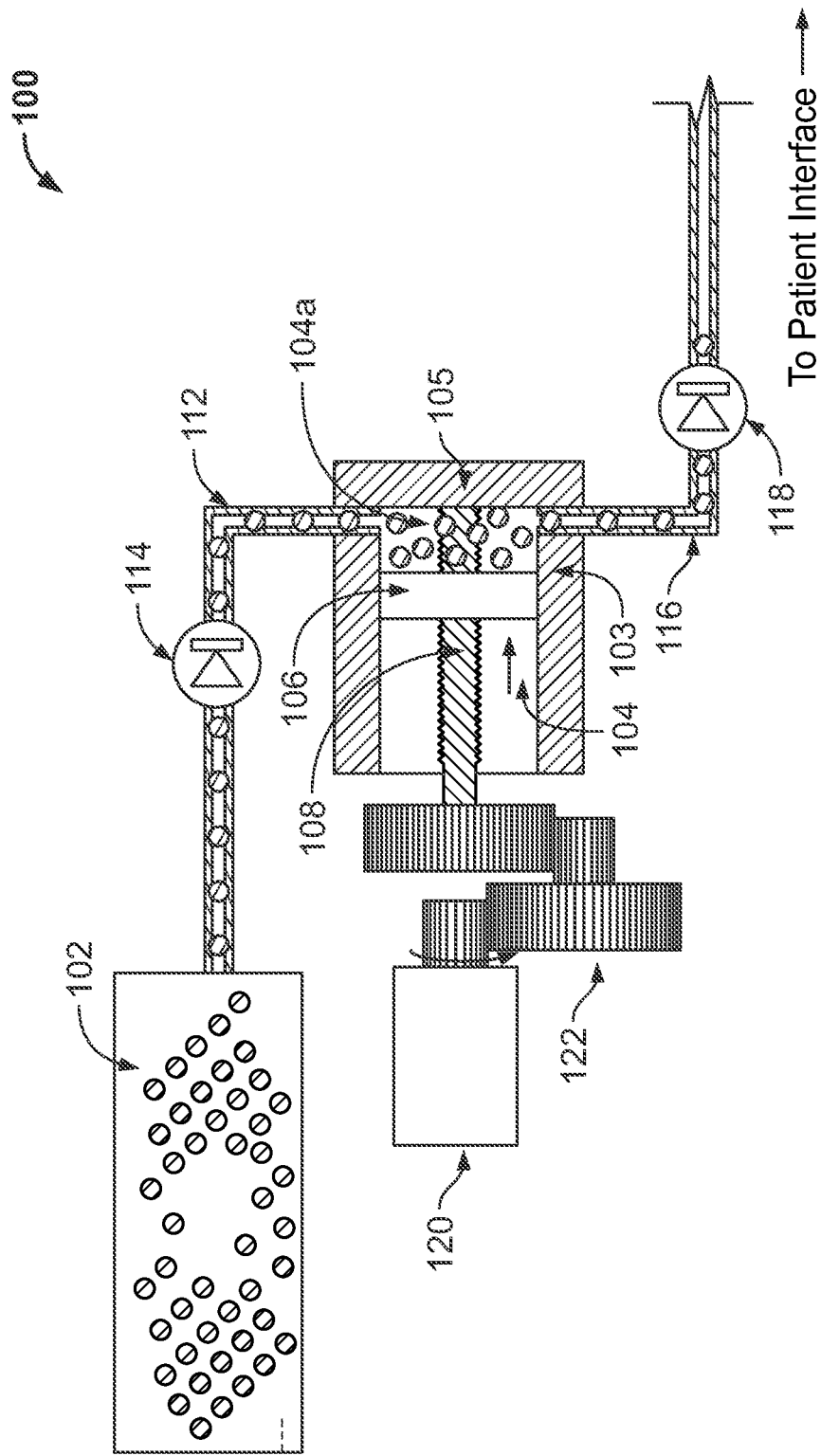
FIG. 11 is a schematic view of the second embodiment of the pump system of the present invention in a third state in which the plunger is moving toward the end wall to force the liquid from the pump chamber to the patient interface.

FIG. 11 is a schematic diagram illustrating the process of pumping liquid 103 from volume 104a through conduit 116 to the patient interface. Motor 120 may be rotated in a direction opposite the direction of rotation used to draw liquid 103 into volume 104a such as to move plunger 106 toward end wall 105 as shown by the arrow in FIG. 11, thereby creating a positive pressure within volume 104a. The movement of plunger 106 toward end wall 105 reduces the size of volume 104a and forces liquid 103 into the conduit 116 and out to the patient through the patient interface. One-way valve 114 prevents liquid 103 from returning to reservoir 102 as plunger 106 moves toward end wall 105, ensuring that all of liquid 103 within volume 104a is forced into conduit 116.

Figure 12:
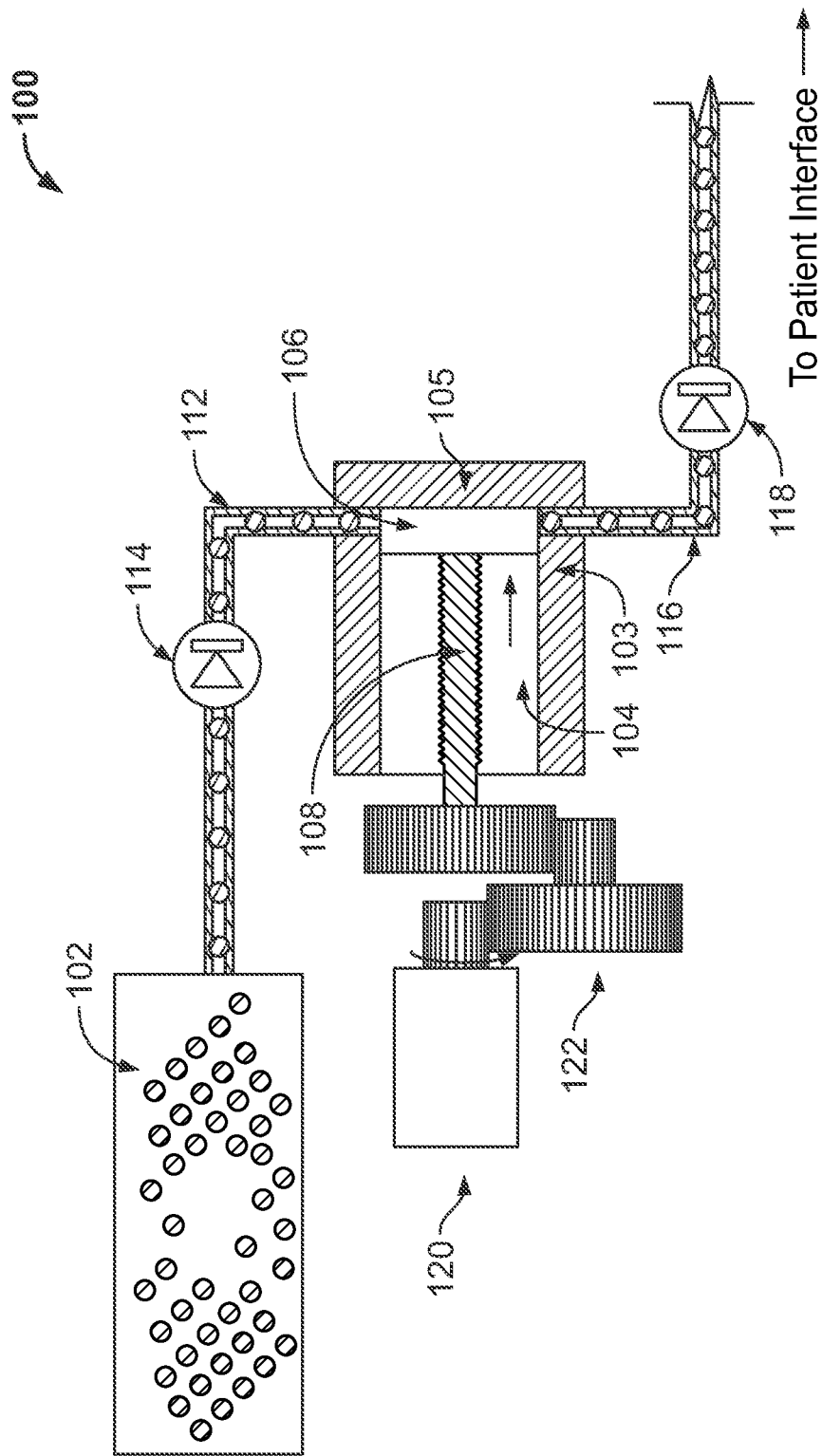
FIG. 12 is a schematic view of the second embodiment of the pump system of the present invention in a fourth state in which all the liquid has been forced from the pump chamber toward the patient interface.

Once plunger 106 has reached a position where it is touching end wall 105, as shown in FIG. 12, all, or most of liquid 103 within volume 104a will have been forced into conduit 116 to the patient interface. Plunger 106 does not necessarily need to touch end wall 105 to complete a cycle of liquid delivery. However, to reduce the amount of residual liquid within the system, and hence reduce the amount of wasted liquid at the end of usage of system 100, plunger 106 preferably comes into contact with end wall 105 at the end of each cycle of liquid delivery, or alternatively, at a final cycle of drug delivery when all or nearly all of liquid drug has been dispensed from reservoir 102. Having plunger 106 come into contact with end wall 105 only at a final cycle of drug delivery will reduce the impact that plunger 106 has on constituents of the liquid (e.g., molecules of insulin) during each cycle of liquid delivery, thereby prolonging the life or effectiveness of the liquid (e.g., protein molecules within the liquid).

It should be noted that conduits 112, 116 must interface with pump chamber 104 in the volume 104a between plunger 106 and end wall 105. In preferred embodiments of the invention, conduits 112 and 116 will connect to volume 104a directly adjacent end wall 105, such that when plunger 106 is in the position shown in FIG. 12, both inlet port 113 and outlet port 117 are blocked.

Figure 13:
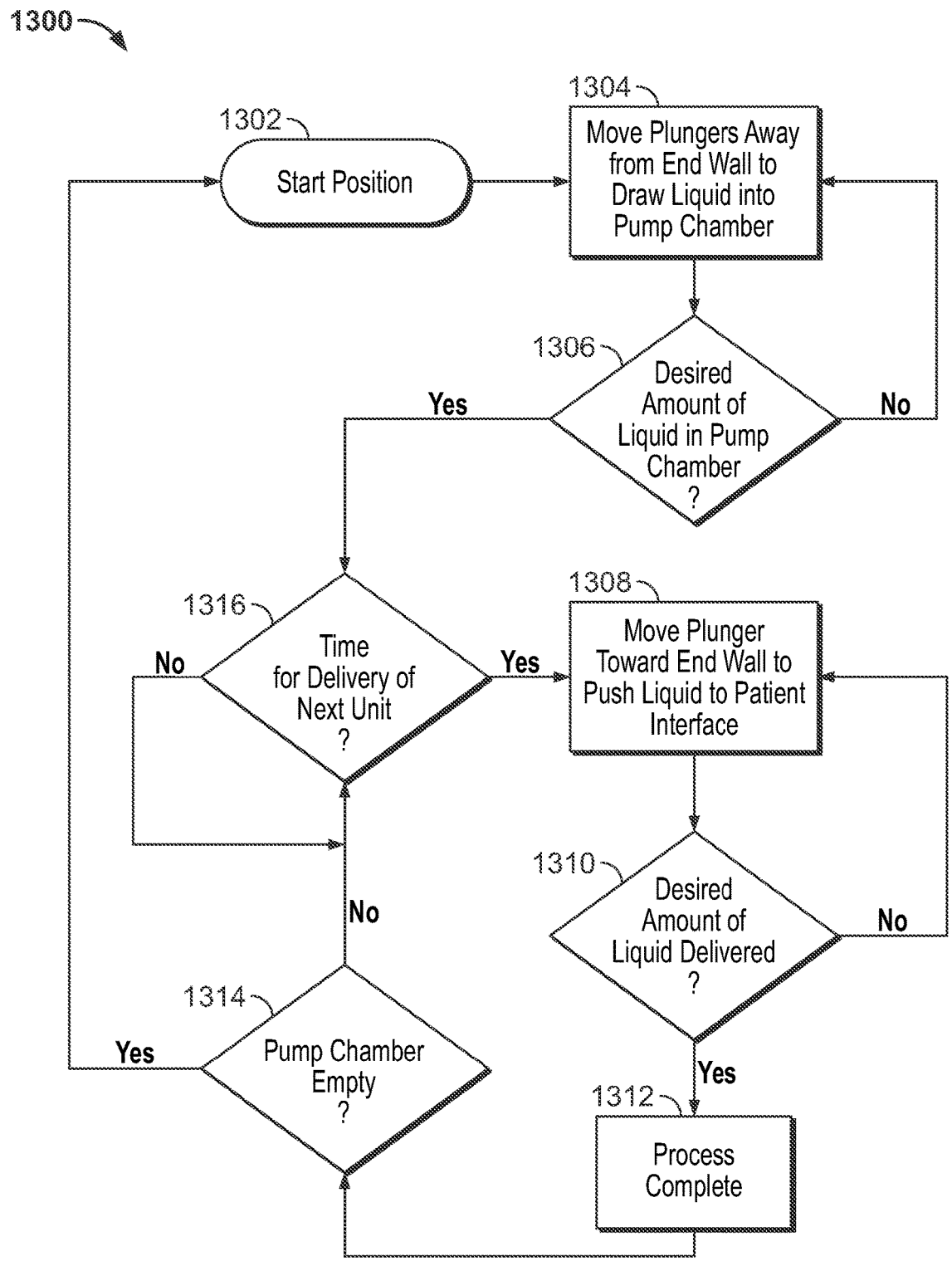
FIG. 13 is a flowchart showing the process of the second embodiment of the invention in which one or multiple units of the liquid are moved from the reservoir to the patient interface.

FIG. 13 shows a flowchart showing process 1300 for delivery of liquid 103 from the reservoir 102 to the patient interface. The system 100 begins from a start position 1302. The start position is preferably the position wherein plunger 106 is in contact with end wall 105 such that volume 104a is reduced to virtually zero.

At block 1304, the plunger 106 is moved away from end wall 105 by turning of leadscrew 108 and liquid 103 is drawn from reservoir 102 into the volume 104a between plunger 106 and end wall 105. At block 1306, it is determined whether the desired quantity of liquid 103 has been drawn into volume 104a and, if not, control is returned to block 1304, where the plunger 106 continues to move away from end wall 105 until the desired quantity of liquid 103 is present in volume 104a.

At block 1316 it is determined if it is time for the delivery of the additional units of liquid 103 to the patient. If so, control is sent to block 1308 and if not, system 100 loops at decision point 1316 until triggered.

At block 1308, the movement of plunger 106 toward end wall 106 is initiated by rotation of leadscrew 108 in an opposite direction, such as to force a quantity of liquid 103 from volume 104a and into conduit 116, and from there to the patient interface. At 1310 it is determined if the quantity so far delivered to the patient interface comprises the desired quantity and, if not, control returns to 1308, where the plunger 106 continues to move toward end wall 105 to push a further quantity of liquid 103 to the patient interface. At 1310, if the desired quantity of liquid 103 has been delivered to the patient interface, the process is complete at 1312.

At decision point 1314, it is determined if the volume 104a is empty and, if so, control returns to start position 1302 and the process repeats with the loading of an additional quantity of liquid 103 from reservoir 102 to volume 104a. If volume 104a is not empty, control returns to decision point 1316, where the process loops until the delivery the next unit of liquid 103 is triggered.

The embodiments described herein provide numerous benefits over existing prior art systems. As will be appreciated by a person of ordinary skill in the art, and, in particular with wearable devices, the comfort of the patient can be enhanced by reducing the size of the device. The above described embodiments accomplish this by allowing for a pump mechanism having a smaller cross-sectional area and, in addition, utilizing non-circular cross-sectional shapes that could, for instance, be provided as a flattened rectangular shape, thereby reducing the profile of the device. In addition, the smaller cross-sectional area of the pump mechanism, in addition to the fact that only a portion of the quantity of liquid in the reservoir is drawn into the pump chamber at any one time, allows for the use of a smaller, less powerful motor to drive the plungers.

The following examples pertain to further embodiments:

Example 1 is a pump system comprising a pump chamber, a leadscrew having both left-hand threading and right-hand threading disposed along the longitudinal axis of the pump chamber and two plungers coupled to the leadscrew such that rotation of the leadscrew in a first direction causes the plungers to move together and a rotation of the leadscrew in the other direction causes the plungers to move apart.

Example 2 is an extension of Example 1, or any other example disclosed herein, wherein the pump chamber has a non-circular cross-sectional shape.

Example 3 is an extension of Example 1, or any other example disclosed herein, wherein the pump chamber is configured with an inlet port and an outlet port.

Example 4 is an extension of Example 3, or any other example disclosed herein, wherein the inlet port and an outlet port are located in an area of the sidewall between the two plungers.

Example 5 is an extension of Example 4 or any other example disclosed herein, in which the pump system further comprises a reservoir connected to the pump chamber through the inlet conduit connected to the input port of the pump chamber, and a one-way valve disposed between the reservoir and the pump chamber which allows fluid flow in a direction from the reservoir into the pump chamber but not in the reverse direction.

Example 6 is an extension of Example 5, or any other example disclosed herein, wherein the reservoir is collapsible.

Example 7 is an extension of Example 5, or any other example disclosed herein, wherein the pump system further comprises a patient interface connected to the pump chamber through an outlet conduit connected to the outlet port of the pump chamber and a one-way valve allowing fluid to flow in a direction from the pump chamber to the patient interface but not in the reverse direction.

Example 8 is an extension of Example 7, or any other example disclosed herein, wherein the movement of the plungers away from each other causes a negative pressure in the space between the plungers, thereby drawing liquid in the reservoir into the pump chamber.

Example 9 is an extension of Example 8, or any other example disclosed herein, wherein movement of the plungers toward each other causes a positive pressure in the space between the plungers, thereby forcing liquid in the pump chamber into the outlet conduit.

Example 10 is an extension of Example 9, or any other example disclosed herein, wherein the volume of the space between the first and second plungers is algorithmically determined based on the number of turns of the leadscrew.

Example 11 is an extension of Example 9, or any other example disclosed herein, wherein the volume of the space between the first and second plungers is algorithmically determined based on input from a sensor.

Example 12 is an extension of Example 9, or any other example disclosed herein, wherein a quantity of a liquid disposed in the reservoir is drawn into the pump chamber as the plungers move away from each other.

Example 13 is an extension of Example 9, or any other example disclosed herein, wherein a single unit of the liquid may be forced into the patient interface by movement of the plungers such as to reduce the volume of the space therebetween by a predetermined amount corresponding to a single unit of the liquid.

Example 14 is an extension of Example 1, or any other example disclosed herein, wherein the pump system further comprises a drive for rotating the leadscrew in either direction.

Example 15 is extension of Example 14, or any other example disclosed herein, wherein the drive comprises a motor coupled to the leadscrew via one or more gears.

Example 16 is a method comprising moving two plungers away from each other within the pump chamber to draw a quantity of a liquid into the pump chamber and moving the plungers toward each other to deliver a desired quantity of the liquid to a patient interface.

Example 17 is an extension of the Example of 16, or any other example disclosed herein, wherein the liquid is stored in an external reservoir which is coupled to the pump chamber via an inlet conduit having a one-way valve to prevent the liquid from moving from the pump chamber to the reservoir.

Example 18 is an extension of Example 18, or any other example disclosed herein, wherein the patient interface is coupled to the pump chamber via an outlet conduit configured with a one-way valve to prevent fluids from moving from the outlet conduit into the pump chamber.

Example 19 is an extension of Example 17, or any other example disclosed herein, wherein the first and second plungers are coupled to a leadscrew having both left-hand and right-hand threading and wherein rotation the leadscrew in a first direction causes the plungers to move toward each other and in a second, opposite direction causes the plungers to move away from each other and further wherein the leadscrew is coupled to a motor to drive the leadscrew in either direction.

Example 20 is a pump system which comprises a pump chamber, a threaded leadscrew extending along a longitudinal axis of the pump chamber, a plunger coupled to the leadscrew, an inlet port coupled to a reservoir and an outlet port coupled to a patient interface, wherein rotation of the leadscrew causes the plunger to move away from the closed end of the pump chamber to draw liquid from the reservoir into the pump chamber and rotation of the leadscrew in a second, opposite direction causes the plunger to move toward the closed end of the pump chamber thereby forcing the liquid from the pump chamber to the patient interface.

Certain embodiments of the present invention were described above. It is, however, expressly noted that the present invention is not limited to those embodiments, but rather it is intended that additions and modifications to the expressly described embodiments herein are also to be included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description. Future filed applications claiming priority to this application may claim the disclosed subject matter in a different manner and may generally include any set of one or more limitations as variously disclosed or otherwise demonstrated herein.

The invention claimed is:

1. A pump system comprising:
    a pump chamber comprising a tube-like structure, at least one end of the pump chamber being open-ended;
    a leadscrew, extending along a longitudinal axis of the pump chamber, the leadscrew having left-hand and right-hand threads defined thereon;
    a first plunger coupled to the leadscrew via the left-hand threads; and
    a second plunger, coupled to the leadscrew via the right-hand threads;
    wherein rotation of the leadscrew in a first direction causes the first and second plungers to move toward each other and further wherein rotation of the leadscrew in a second, opposite direction causes the first and second plungers to move away from each other.

2. The pump system of claim 1, wherein the pump chamber has a non-circular cross-sectional shape.

3. The pump system of claim 1, further comprising:
    an inlet port, defined in a sidewall of the pump chamber; and
    an outlet port, defined in the sidewall of the pump chamber.

4. The pump system of claim 3 wherein the inlet port and outlet port are located in an area of the sidewall between the first and second plungers.

5. The pump system of claim 4 further comprising:
    an inlet conduit coupled to the inlet port;
    a reservoir, in fluid communication with the pump chamber via the inlet conduit; and
    an inlet one-way valve, disposed between the reservoir and the pump chamber, the one-way valve allowing fluid to flow from the reservoir into the pump chamber and preventing fluid from flowing from the pump chamber to the reservoir.

6. The pump system of claim 5 wherein the reservoir is collapsible.

7. The pump system of claim 5, further comprising:
    an outlet conduit, coupled to the outlet port;
    a patient interface, in fluid communication with the pump chamber via the outlet conduit; and
    an outlet one-way valve, disposed between the pump chamber and the patient interface, the one-way valve allowing fluid to flow from the pump chamber to the patient interface and preventing fluid from flowing from the patient interface to the pump chamber.

8. The pump system of claim 7, wherein movement of the plungers away from each other causes a negative pressure in a space between the plungers within the pump chamber, the negative pressure drawing a liquid disposed in the reservoir into the pump chamber through the inlet conduit.

9. The pump system of claim 8 where movement of the plungers toward each other causes a positive pressure in the space between the plungers within the pump chamber, the positive pressure forcing the liquid in the pump chamber into the outlet conduit.

10. The pump system of claim 9 wherein the volume of the space between the first and second plungers can be algorithmically determined based on the number of turns of the leadscrew.

11. The pump system of claim 9 wherein the volume of the space between the first and second plungers can be algorithmically determined based on input from one or more sensors.

12. The pump system of claim 9 wherein one or more units of the liquid may be drawn into the reservoir as the plungers move away from each other.

13. The pump system of claim 9 wherein a single unit of the liquid may be sent to the patient interface by movement of the first and second plungers to reduce the volume of the space between the first and second plungers by a predetermined amount corresponding to the single unit of the liquid.

14. The pump system of claim 1 further comprising:
a drive, coupled to the leadscrew, for rotating the leadscrew in the first and second directions.

15. The pump system of claim 14 wherein the drive comprises a motor coupled to the leadscrew via one or more gears.

* * * * *